(12) United States Patent
Crouch et al.

(10) Patent No.: US 10,527,729 B2
(45) Date of Patent: *Jan. 7, 2020

(54) METHOD AND SYSTEM FOR THREE DIMENSIONAL DIGITAL HOLOGRAPHIC APERTURE SYNTHESIS

(71) Applicants: Blackmore Sensors & Analytics, LLC, Palo Alto, CA (US); Montana State University, Bozeman, MT (US)

(72) Inventors: Stephen C. Crouch, Bozeman, MT (US); Brant M. Kaylor, Merrimack, NH (US); Zeb W. Barber, Bozeman, MT (US); Randy R. Reibel, Bozeman, MT (US)

(73) Assignees: BLACKMORE SENSORS AND ANALYTICS, LLC, Palo Alto, CA (US); MONTANA STATE UNIVERSITY, Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,085

(22) Filed: Jul. 3, 2018

(65) Prior Publication Data

US 2019/0242999 A1    Aug. 8, 2019

Related U.S. Application Data

(63) Continuation of application No. 15/192,119, filed on Jun. 24, 2016, now Pat. No. 10,036,812.
(Continued)

(51) Int. Cl.
*G01S 17/89*  (2006.01)
*G03H 1/00*   (2006.01)
(Continued)

(52) U.S. Cl.
CPC .......... *G01S 17/895* (2013.01); *G01S 17/325* (2013.01); *G03H 1/0005* (2013.01);
(Continued)

(58) Field of Classification Search
CPC ..................... G03H 1/0005; G03H 2222/33
See application file for complete search history.

(56) References Cited

U.S. PATENT DOCUMENTS 4,099,249 A    7/1978   Casasent
5,257,202 A *  10/1993  Feddersen .......... G01N 21/6408
                                                250/458.1
(Continued)

FOREIGN PATENT DOCUMENTS

CN    105652282 A     6/2016
WO    2007124063 A2   11/2007
(Continued)

OTHER PUBLICATIONS

Adany, P., et al., "Chirped Lidar Using Simplified Homodyne Detection", Aug. 15, 2009, pp. 3351-3357, vol. 27, No. 16, Publisher: Journal of Lightwave Technology, Published in: DOI: 10.1109/JLT.2009.2016220.
(Continued)

*Primary Examiner* — Paulos M Natnael
(74) *Attorney, Agent, or Firm* — Foley & Lardner LLP

(57) ABSTRACT

Laser 3D imaging techniques include splitting a laser temporally-modulated waveform of bandwidth B and duration D from a laser source into a reference beam and a target beam and directing the target beam onto a target. First data is collected, which indicates amplitude and phase of light relative to the reference beam received at each of a plurality of different times during a duration D at each optical detector of an array of one or more optical detectors perpendicular to the target beam. Steps are repeated for multiple sampling
(Continued)

conditions, and the first data for the multiple sampling conditions are synthesized to form one or more synthesized sets. A 3D Fourier transform of each synthesized set forms a digital model of the target for each synthesized set with a down-range resolution based on the bandwidth B.

16 Claims, 15 Drawing Sheets

Related U.S. Application Data

(60) Provisional application No. 62/183,921, filed on Jun. 24, 2015.

(51) Int. Cl.
| | | |
|---|---|---|
| *G03H 1/04* | (2006.01) | |
| *G01S 17/32* | (2006.01) | |
| *G03H 1/08* | (2006.01) | |
| *G03H 1/26* | (2006.01) | |

(52) U.S. Cl.
CPC ......... *G03H 1/0443* (2013.01); *G03H 1/0465* (2013.01); *G03H 1/0866* (2013.01); *G03H 2001/046* (2013.01); *G03H 2001/0445* (2013.01); *G03H 2001/2655* (2013.01); *G03H 2222/33* (2013.01); *G03H 2226/13* (2013.01)

(56) References Cited

U.S. PATENT DOCUMENTS

| | | | | |
|---|---|---|---|---|
| 5,504,719 | A * | 4/1996 | Jacobs | G01H 9/00 367/149 |
| 5,781,156 | A * | 7/1998 | Krasner | G01S 19/05 342/357.77 |
| 6,753,950 | B2 | 6/2004 | Morcom | |
| 6,931,055 | B1 | 8/2005 | Underbrink et al. | |
| 7,295,311 | B2 * | 11/2007 | Nicoli | G01N 21/51 356/344 |
| 7,345,770 | B2 * | 3/2008 | Chan | A61B 3/102 356/489 |
| 7,511,824 | B2 | 3/2009 | Sebastian et al. | |
| 7,742,152 | B2 | 6/2010 | Hui et al. | |
| 7,917,039 | B1 | 3/2011 | Delfyett | |
| 8,446,592 | B1 * | 5/2013 | Arissian | G01B 9/02003 356/484 |
| 8,531,650 | B2 | 9/2013 | Feldkhun et al. | |
| 8,805,197 | B2 | 8/2014 | Delfyett | |
| 9,383,753 | B1 | 7/2016 | Templeton et al. | |
| 10,036,812 | B2 * | 7/2018 | Crouch | G01S 17/895 |
| 2002/0071109 | A1 | 7/2002 | Allen et al. | |
| 2004/0109155 | A1 | 6/2004 | Deines | |
| 2006/0239312 | A1 * | 10/2006 | Kewitsch | H01S 5/0683 372/29.023 |
| 2008/0018881 | A1 * | 1/2008 | Hui | G01S 7/4917 356/5.09 |
| 2009/0002679 | A1 | 1/2009 | Ruff et al. | |
| 2010/0183309 | A1 | 7/2010 | Etemad et al. | |
| 2010/0188504 | A1 * | 7/2010 | Dimsdale | G01C 11/06 348/142 |
| 2011/0205523 | A1 | 8/2011 | Rezk et al. | |
| 2011/0292371 | A1 | 12/2011 | Chang | |
| 2012/0038902 | A1 | 2/2012 | Dotson | |
| 2012/0274922 | A1 * | 11/2012 | Hodge | F41J 5/02 356/28 |
| 2015/0046119 | A1 | 2/2015 | Sandhawalia et al. | |
| 2015/0185244 | A1 | 7/2015 | Inoue et al. | |
| 2015/0323660 | A1 | 11/2015 | Hampikian | |
| 2016/0091599 | A1 | 3/2016 | Jenkins | |
| 2016/0123720 | A1 | 5/2016 | Thorpe et al. | |
| 2016/0216366 | A1 | 7/2016 | Phillips et al. | |
| 2016/0377724 | A1 * | 12/2016 | Crouch | G01S 17/895 348/40 |
| 2017/0343652 | A1 | 11/2017 | de Mersseman et al. | |
| 2017/0350964 | A1 | 12/2017 | Kaneda | |
| 2018/0224547 | A1 | 8/2018 | Crouch et al. | |

FOREIGN PATENT DOCUMENTS

| | | |
|---|---|---|
| WO | 2010127151 A2 | 11/2010 |
| WO | 2018102188 A1 | 6/2018 |
| WO | 2018102190 A1 | 6/2018 |
| WO | 2018125438 A2 | 7/2018 |
| WO | 2018144853 A1 | 8/2018 |
| WO | 2018160240 A2 | 9/2018 |

OTHER PUBLICATIONS

Aull, Brian, et al., "Geiger-Mode avalanche photodiodes for three-dimensional imaging", 2002, pp. 335-350, vol. 13, No. 2, Publisher: Lincoln Laboratory Journal.

Bashkansky, M., et al., "RF phase-coded random-modulation LIDAR", 2004, pp. 93-98, vol. 231, Publisher: Optics Communications, Published in: doi:10.1016/j.optcom.2003.12.029.

Beck, Steven, et al., "Synthetic-aperture imaging laser radar: laboratory demonstration and signal processing", Dec. 10, 2005, pp. 7621-7629, vol. 44, No. 35, Publisher: Applied Optics.

Berkovic, Garry, et al., "Optical methods for distance and displacement measurements", Sep. 11, 2012, pp. 441-471, Publisher: Advances in Optics and Photonics 4, Published in: doi:10.1364/AOP.4. 000441.

Besl, Paul et al., "Method for registration of 3-D shapes", Feb. 1992, pp. 239-255, vol. 14, No. 2, Publisher: IEEE Transactions on Pattern Analysis and Machine Intelligence.

Campbell, Joel, "Super-resolution technique for CW lidar using Fourier transform reordering and Richardson-Lucy deconvolution", Dec. 15, 2014, pp. 6981-6984, vol. 39, No. 24, Publisher: Optics Letters, Published in: https://doi.org/10.1364/OL39.006981.

Cao, Xiaoying, et al., "Lidar Signal Depolarization by Solid Targets and its Application to Terrain Mapping and 3D Imagery", Mar. 2011, pp. 1-74, Publisher: Defence R&D, Contract Report DRDC Valcartier CR 2011-236 Mar. 2011, Published in: http://cradpdf. drdc-rddc.gc.ca/PDFS/unc1236/P5377764_A1b.pdf.

Contu, Francesco, "The Do's and Don'ts of High Speed Serial Design in FPGA's, Copyright 2013 Xilinx", 2013, Publisher: High Speed Digital Design & Validation Seminars 2013.

Crouch, Stephen, et al., "Laboratory demonstrations of interferometric and spotlight synthetic aperture ladar techniques", Oct. 8, 2012, pp. 24237-24246, vol. 20, No. 22, Publisher: Optics Express.

Crouch, Stephen, et al., "Three dimensional digital holographic aperture synthesis", Sep. 2, 2015, pp. 23811-23816, vol. 23, No. 18, Publisher Optics Express, Published in: DOI:10.1364/OE23. 023811.

Dapore, Benjamin, et al., "Phase noise analysis of two wavelength coherent imaging system", Dec. 5, 2013, pp. 30642-30652, vol. 21, No. 25, Publisher: Optics Express, Published in: DOI:10.1364/OE. 21.030642.

Duncan, Bradley, et al., "Holographic aperture ladar", Feb. 19, 2009, pp. 1168-1177, vol. 48, No. 6, Publisher: Applied Optics, Published in: Dayton, OH.

Duncan, Bradley, et al., "Holographic aperture ladar: erratum", Jan. 30, 2013, pp. 706-708, vol. 52, No. 4, Publisher: Applied Optics, Published in: Dayton, OH.

Fehr, Duc, et al., "Compact Covariance descriptors in 3D point clouds for object recognition, presented at the Robotics and Automation (ICRA),", , pp. 1793-1798, Publisher: 2012 IEEE International Conference on Robotics and Automation, Published in: Saint Paul, Minnesota, USA.

Foucras, Myriam, et al., "Detailed Analysis of the Impact of the Code Doppler on the Acquisition Performance of New GNSS Signals", Jan. 2014, pp. 1-13, Publisher: ION ITM 2014, International Technical Meeting of the Institute of Navigation, Published in: San Diego, United States.

"Fundamentals of Direct Digital Synthesis, MT-085 Tutorial, Rev. 0", Oct. 2008, pp. 1-9, Publisher: Analog Devices, Inc.

(56) References Cited

OTHER PUBLICATIONS

Garcia, Javier, et al., "Detection of Three Dimensional Objects Based on Phase Encoded Range Images", "Proceedings of SPIE", 2004, pp. 269-280, vol. 5477, Publisher: Sixth International Conference on Correlation Optics, Published in: doi: 10.1117/12.560064.
Haralick, Robert, et al., "Image Analysis Using Mathematical Morphology", Jul. 1987, pp. 532-550, vol. PAMI-9, No. 4, Publisher: IEEE Transactions on Pattern Analysis and Machine Intelligence.
ISA/US, "International Search Report and Written Opinion for correspondence PCT Application PCT/US17/62721 dated Feb. 6, 2018", pp. 1-12, Published in: Alexandria, VA.
ISA/WO, "International Seach Report and Written Opinion, International Patent Application No. PCT/US18/16632 dated Apr. 24, 2018", Publisher: International Search Authority, US, Published in: Alexandria VA, USA.
ISA/US, "International Search Report and Written Opinion for correspondence PCT Application PCT/US18/41388 dated Sep. 20, 2018", pp. 1-13, Published in: Alexandria, VA.
ISA/US, "International Search Report and Written Opinion for correspondence PCT Application PCT/US18/44007 dated Oct. 25, 2018", pp. 1-11, Published in: Alexandria, VA.
ISA/US, "International Search Report and Written Opinion for correspondence PCT Application PCT/US17/62703 dated Aug. 27, 2018", pp. 1-13, Published in: Alexandria, VA.
ISA/US, "International Search Report and Written Opinion for correspondence PCT Application PCT/US17/62708 dated Mar. 16, 2018", pp. 1-14, Published in: Alexandria, VA.
ISA/US, "International Search Report and Written Opinion for correspondence PCT Application PCT/US17/62714 dated Aug. 23, 2018", pp. 1-13, Published in: Alexandria, VA.
Johnson, Andrew Edie, "Spin-Images: A Representation for 3-D Surface Matching", Aug. 13, 1997, pp. 1-308, Publisher: doctoral dissertation, tech. report CMU-RI-TR-97-47, Robotics Institute, Carnegie Mellon University.
Kachelmyer, A. L., "Range-Doppler Imaging with a Laser Radar", 1990, pp. 1-32, vol. 3, No. 1, Publisher: The Lincoln Laboratory Journal.
Klasing, Klaas, et al., "Comparison of Surface Normal Estimation Methods for Range Sensing Applications", Jun. 12, 2009, pp. 3206-3211, Publisher: Proceedings of the 2009 IEEE International Conference on Robotics and Automation, Published in: Kobe, Japan.
Krause, Brian, et al., "Motion compensated frequency modulated continuous wave 3D coherent imaging ladar with scannerless architecture", Dec. 19, 2012, pp. 8745-8761, vol. 51, No. 36, Publisher: Applied Optics Optical Society of America, Published in: Louisville, Colorado.
Le, Trung-Thanh, "Arbitrary Power Splitting Couplers Based on 3x3 Multimode Interference Structures for All-optical Computing", Oct. 2011, pp. 565-569, vol. 3, No. 5, Publisher: IACSIT International Journal of Engineering and Technology, Published in: Ha Noi, Viet Nam.
Lu, Min, et al., "Recognizing Objects in 3D Point Clouds with Multi-Scale Local Features", Dec. 15, 2014, pp. 24156-24173, vol. 14, No. 12, Publisher: Sensors, Published in: doi:10.3390/s141224156.
Marron, Joseph, et al., "Three-dimensional lensless imaging using laser frequency diversity", Jan. 10, 1992, pp. 255-262, vol. 31, No. 2, Publisher: Applied Optics, Published in: Ann Arbor, Michigan.
Munkres, James, "Algorithms for the Assignment and Transportation Problems", Mar. 1957, pp. 32-38, vol. 5, No. 1, Publisher: Journal of the Industrial and Applied Mathematics.
O'Donnell, Robert, "Radar Systems Engineering Lecture 11 Waveforms and Pulse Compression", Jan. 1, 2010, pp. 1-58, Publisher: IEE New Hampshire Section.
Oif, "Implementation Agreement for Integrated Dual Polarization Micro-Intradyne Coherent Receivers", Mar. 31, 2015, pp. 1-32, Publisher: Optical Internetworking Forum, Published in: IA # OIF-DPC-MRX-01.0.
Optoplex Corporation, "90 Degree Optical Hybrid", Nov. 9, 2016, pp. 1-2, Published in: Freemont, CA.
Raab, David, et al., "Multi-transmitter aperture synthesis", Nov. 15, 2010, pp. 24937-24945, vol. 18, No. 24, Publisher: Optics Express, Published in: Wright Patterson AFB, Ohio.
Roos, Peter, et al., "Ultrabroadband optical chirp linearization for precision metrology applications", Dec. 1, 2009, pp. 3692-3694, vol. 34, No. 23, Publisher: Optics Letters, Published in: Bozeman, Montana.
Salehian, Hesamoddin, et al., "Recursive Estimation of the Stein Center of SPD Matrices and Its Applications", 2013, pp. 1793-1800, Publisher: 2013 IEEE International Conference on Computer Vision.
Satyan, Naresh, et al., "Precise control of broadband frequency chirps using optoelectronic feedback", Aug. 25, 2009, pp. 15991-15998, vol. 17, No. 18, Publisher: Optics Express.
Stafford, Jason, et al., "Holographic aperture ladar with range compression", Mar. 15, 2017, pp. A1-A9, vol. 34, No. 5, Publisher: Journal of Optical Society of America, Published in: https://doi.org/10.1364/JOSAA.34.0000A1.
Tippie, Abbie, et al., "High-resolution synthetic-aperture digital holography with digital phase and pupil correction", Jun. 6, 2011, pp. 12027-12038, vol. 19, No. 13, Publisher: Optics Express, Published in: Rochester, NY.
Wikipedia, "In-phase and quadrature components", , Publisher: as of Nov. 11, 2016 11:17:19 PM, Published in: https://en.wikipedia.org/wiki/In-phase_and_quadrature_components.
Wikipedia, "Field-programmable gate array", pp. 1-13, Publisher: as of Apr. 15, 2017, Published in: https://en.wikipedia.org/wiki/Field-programmable_gate_array.
Wikipedia, "Digital-to-analog converter", Publisher: as of Apr. 15, 2017, Published in: https://en.wikipedia.org/wiki/Digital-to-analog_converter.
Wikepedia, "Phase-shift keying", Publisher: as of Oct. 23, 2016, Published in: https://en.wikipedia.org/wiki/Phase-shift_keying#Binary_phase-shift_keying.28BPSK.29.
Ye, Jieping, "Least Squares Linear Discriminant Analysis", 2007, pp. 1-8, Publisher: Proceedings of the 24th International Conference, Published in: Tempe, AZ.

\* cited by examiner

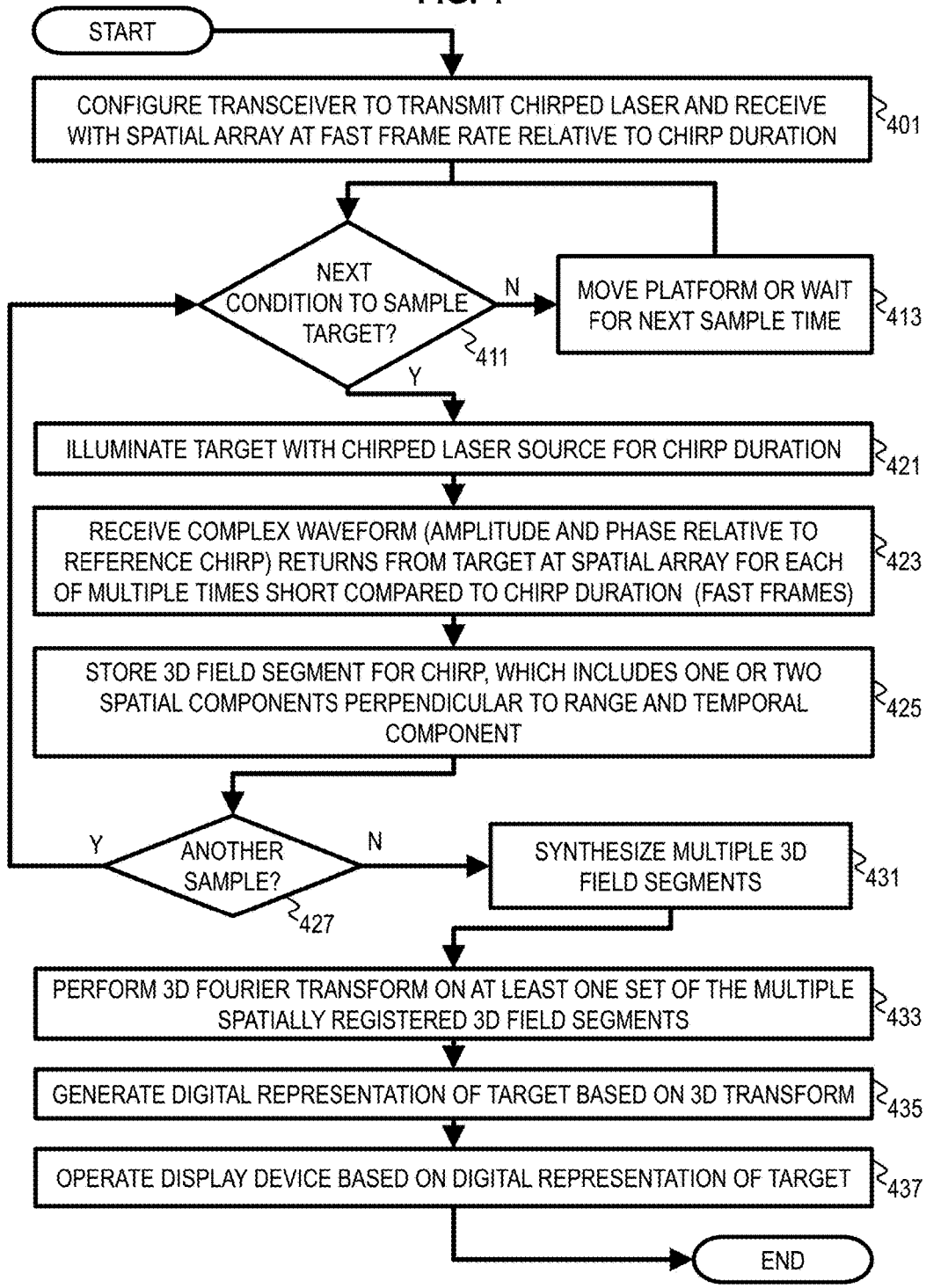

Field Segment
200 x 280 Pixels

METHOD AND SYSTEM FOR THREE DIMENSIONAL DIGITAL HOLOGRAPHIC APERTURE SYNTHESIS

CROSS-REFERENCE TO RELATED APPLICATIONS

This application is a continuation application of U.S. patent application Ser. No. 15/192,119 filed Jun. 24, 2016 which claims benefit of Provisional Appln. 62/183,921, filed Jun. 24, 2015, the entire contents of which are hereby incorporated by reference as if fully set forth herein, under 35 U.S.C. § 119(e).

STATEMENT OF GOVERNMENTAL INTEREST

This invention was made with government support under Contract Nos. FA8650-14-M-1793, FA8650-14-M-1787, and FA8650-15-C-1871 awarded by the Department of the Air Force. The government has certain rights in the invention.

BACKGROUND

Light Detection And Ranging, abbreviated LADAR herein, is a surveying technology that measures distance by illuminating a target with a laser light and timing the return, and the term has been coined as an analogy for the previously well-known technology of radio detection and ranging (RADAR). Three dimensional (3D) imaging based on LADAR has been a rapidly expanding research field with approaches that capitalize on parallel readout architectures seeing significant advancement recently. For example, in flash LADAR systems, the target is broadly illuminated with a high energy pulsed laser and a receive aperture is used to image the target onto a fast focal-plane array (FPA) of optical detectors. The fast FPA typically consists of an array of avalanche photodiodes (APDs) coupled to an advanced read-out-integrated-circuit (ROIC), which also allows it to time resolve the return pulses. Several companies now manufacture fast FPAs operating either in linear or Geiger mode for short and long range flash LADAR respectively. Over the past decade, incoherent, direct-detect flash LADAR has been used for both terrestrial and airborne applications including mapping and autonomous navigation.

Synthetic aperture LADAR (SAL), distributed or sparse aperture imaging and holographic aperture LADAR (HAL) are coherent imaging techniques that coherently combine spatially and temporally diverse target returns to overcome the conventional diffraction limit. By recording individual estimates of the electric field with either a single optical detector or an optical detector array, and by considering the relative motion between the transceiver and the target, these field estimates can be synthesized or "stitched" in the pupil plane to produce enhanced resolution two dimensional (2D) imagery. The pupil plane is the plane in which light first impinges on the optics of a system, before any focusing of the impinging rays. To form 3D imagery, two or more baselines in an interferometric SAL system, or two or more wavelengths in a distributed aperture or HAL system have been proposed and demonstrated. The unresolved dimension is derived from the measured phase difference between the spatial or wavelength multiplexed 2D images. Because these techniques rely on a few synthetic wavelengths, targets with significant structure or discontinuities are poorly rendered. Recent work extended the number of discrete wavelengths to 256 to address these issues.

SUMMARY

The achievable cross-range resolution in flash LADAR is limited by the conventional diffraction limit imparted by the receive aperture size, while the down-range resolution is limited by the effective bandwidth of the LADAR system. These resolution constraints typically limit the applicability of flash LADAR especially when ultra-high resolution is required, such as in large-volume metrology applications. Targets with significant structure or discontinuities are still not satisfactory rendered by the SAL and HAL techniques for some applications, such as in large-volume metrology applications, even with the larger number of wavelengths attempted to date.

Techniques are provided to demonstrate for the first time, fully down-range resolved coherent imaging with aperture synthesis. In some embodiments, this technique is called three dimensional holographic aperture LADAR (3D-HAL) for brevity; but, does not require the two dimensional array of detectors required in HAL. For example, the transverse sampling can be achieved with a single point detector if precise (with precision small compared to the transverse extent of the detector) measurement of the transverse location of the detector is available at all sample points. With an array, it is possible to sample field segments with some overlap which can then be used for registration of the field. Herein the technique is called, more generally, high resolution 3D LADAR.

In a first set of embodiments, a method includes step a for splitting a laser temporally-modulated waveform of bandwidth B and duration D from a laser source into a reference beam and a target beam and step b for directing the target beam onto a target. The method includes step c for collecting first data that indicates amplitude and phase of light relative to the reference beam received at each of a plurality of different times during a duration D at each optical detector of an array of one or more optical detectors in a plane perpendicular to the target beam. The method also includes step d for repeating steps a, b and c for multiple sampling conditions, and step e for synthesizing the first data for the multiple sampling conditions to form one or more synthesized sets. The method still further includes step f for performing a 3D Fourier transform of each synthesized set to form a digital model of the target for each synthesized set with a down-range resolution based on the bandwidth B. In some embodiments, the method also includes step g for operating a display device based at least in part on at least a portion of the digital model of the target for at least one synthesized set.

In some embodiments of the first set of embodiments, synthesizing the first data further comprises, for each synthesized set, selecting a plurality of subsets of the first data, synthesizing each subset separately to produce a synthesized subset and incoherently combining the plurality of synthesized subsets.

In some embodiments of the first set of embodiments, performing a 3D Fourier transform of each synthesized set further comprises performing a one dimensional Fourier Transform of each dimension independently and combining results from all dimensions. In some of these embodiments, each dimension is transformed in separate sub-sections to further limit memory overhead consumption.

In some embodiments of the first set, the array of one or more optical detectors is a subset of pixels in a digital camera to allow a frame rate for the subset of pixels to be greater than a frame rate for all the pixels in the digital camera. In these embodiments, repeating steps a, b, and c for the plurality of sampling conditions includes repeating steps a, b, and c for a plurality of different subsets of the pixels in the digital camera.

In some of the first set of embodiments, the method also includes determining an average range to the target based on a travel time of a laser pulse reflected from the target and providing a reference path length for the reference beam based on the average range to the target.

In some of the first set of embodiments, the digital model is a point cloud and the display device is a system configured to render a surface from a point cloud.

In various embodiments of the first set of embodiments, the display device is either a system configured to identify an object based on the digital model, or a system configured to operate on the target based on the digital model, or both.

In some of the first set of embodiments, the pluralities of sampling conditions are a plurality of different angles from the target to the array of one or more optical detector.

In some of the first set of embodiments, the plurality of sampling conditions is a plurality of different times while the target is subjected to a change in environment or while one target is replaced by another.

In some of the first set of embodiments, the one or more synthesized sets includes at least two synthesized sets; and, the step of operating the display device further comprises operating the display device to present second data that indicates a difference between at least two different digital models formed from the at least two synthesized sets. In some of these embodiments, the synthesized sets represent shapes of an object for corresponding different sampling conditions (e.g., different times or different angles, or different instances of an assembly line of similar targets). In some of these latter embodiments, the change in environment is a change in thermal conditions and the difference between the at least two different digital models indicates thermal expansion in response to the change in thermal conditions.

In other sets of embodiments, a computer-readable medium or an apparatus or a system is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 4 is a flow diagram that illustrates an example method of using a high resolution 3D LADAR system, according to an embodiment;

DETAILED DESCRIPTION

Figure 1:
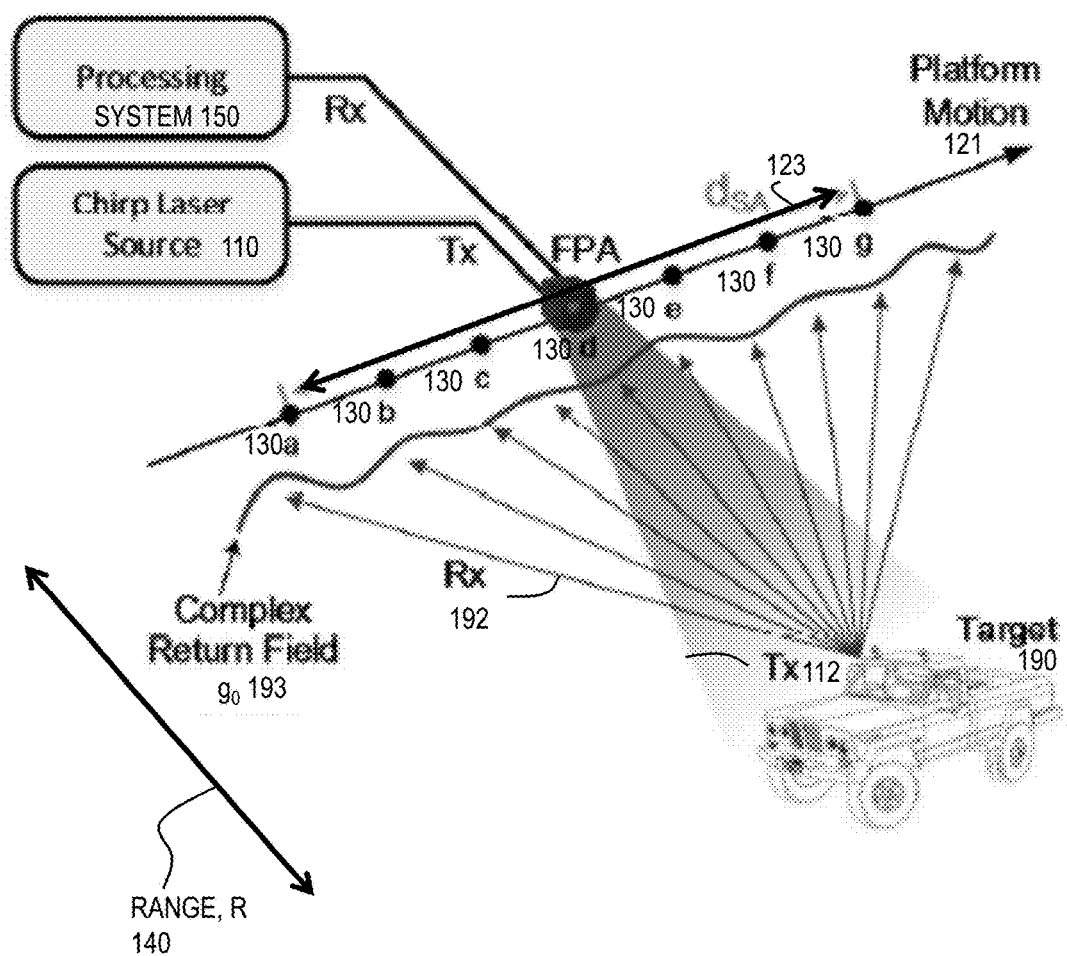
FIG. 1 is a block diagram that illustrates example operation of a high resolution 3D LADAR system, according to an embodiment.

A method and apparatus are described for high resolution 3D LADAR, including 3D-HAL. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of 3D-HAL at 2 kilometer ranges with centimeter down-range resolution, and at 250 centimeter ranges with micron down-range resolution for metrology. However, the invention is not limited to this context. In other embodiments, stationary arrays are used with high resolution 3D LADAR processing to monitor objects in time, e.g., to compare similar objects coming off an assembly line; to monitor stresses in objects imposed by harsh environmental conditions, such as at high and low temperatures or at high and low pressures and in the presence of corrosive chemical environments, or some combination; to use stationary or moving arrays to form digital representations used by other system to classify or identify objects, or control robots to operate on or avoid objects, or weapons systems to attack or avoid objects, or surveillance system to rescue people, animals or other objects, or for space based imaging, among other applications.

1. OVERVIEW

In 3D-HAL, a temporally-modulated waveform (a form of frequency or phase modulated continuous wave, FMCW or PMCW) is introduced for ranging at each aperture location, which is not used in HAL. In many illustrated embodiments, the temporal modulation is a linear frequency change and is called a chirp. In addition heterodyne detection is used with the same laser temporally-modulated waveform as a reference. While any coherent form of laser ranging could be utilized, FMCW chirped heterodyne ranging has the advantage of providing very high downrange resolution with a reduced receiver bandwidth via optical stretched processing. The achievable range resolution, $\delta_R$, of this technique is limited by the chirp bandwidth, B, and is described by Equation 1.

$$\delta_R = c/(2B) \quad (1)$$

where c is the speed of light.

FIG. 1 is a block diagram that illustrates example operation of a high resolution 3D LADAR system, according to an embodiment. A chirped transmit source 110 produces transmitted light (Tx) 112 that flood illuminates a target 190 at some nominal range R, and the fast focal plane array (FPA) records the interference between the returned light (Rx) 192 and a reference beam chirp produced concurrently with the transmitted light Tx. The complex return field $g_0(x,y,t)$ 193 resulting from the heterodyne interference encodes the 3-D spatial information at various positions 130a through 130g, collectively referenced as positions 130, along a line of travel 121. The total synthetic aperture, $d_{SA}$ 123, provides enhanced resolution along the direction of platform motion along line of travel 121. The chirp provides enhanced down-range resolution to allow 3D rendering of the target 190. The data collected is referred to as a field segment, $g_0(x,y,t_f)$, where x and y are cross-range coordinates and $t_f$ is the time during which the temporal interference is recorded (i.e. "fast time" in SAL formalism), which is short compared to the chirp duration D. Throughout this paper, sensor arrays that are capable of recording this temporal interference are called "fast FPAs" to distinguish them from more traditional sensor arrays that operate with very slow frame rates. However, in 3D-HAL the fast FPAs need not be restricted to being placed in the "focal plane" as the acronym suggests. But can be placed in the pupil plane as shown in FIG. 1.

Figure 2:
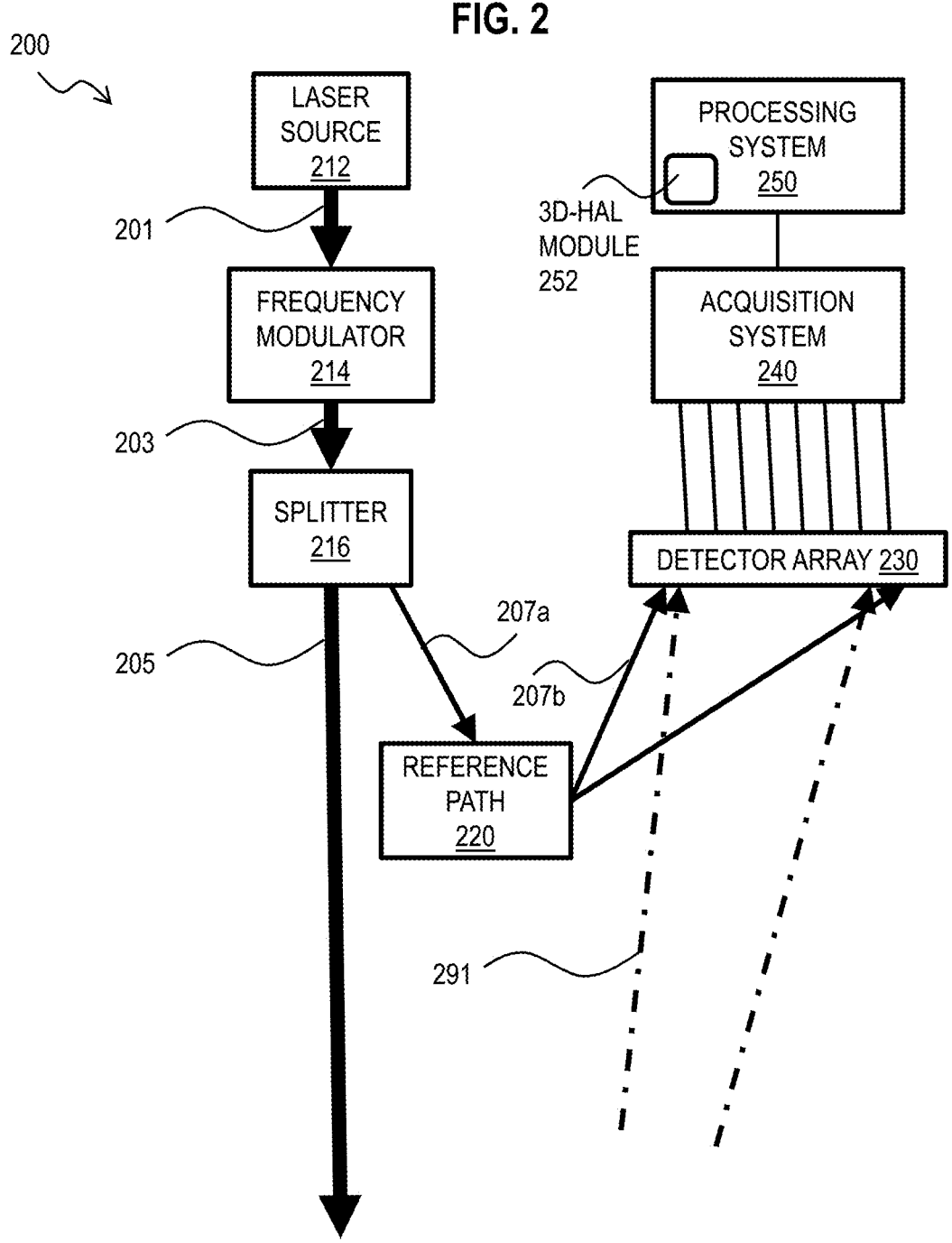
FIG. 2 is a block diagram that illustrates example components of a high resolution 3D LADAR system, according to an embodiment.

FIG. 2 is a block diagram that illustrates example components of a high resolution 3D LADAR system, according to an embodiment. A laser source 212 emits a carrier wave 201 that is frequency modulated in frequency modulator 214 to produce a chirp of time dependent frequency that has a bandwidth B and a duration D. A splitter 218 splits the chirp into a target beam 205 with most of the energy of the beam 203 and a reference beam 207 with a much smaller amount of energy that is nonetheless enough to produce good heterodyne interference with the returned light 291 scattered from the target 190. The reference beam is delayed in a reference path 220 sufficiently to arrive at the detector array 230 with the scattered light. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination.

The detector array is a single detector or a 1D or 2D array of detectors arranged in a plane perpendicular to target beam 205. The phase and amplitude of the interface pattern is recorded by acquisition system 240 for each detector at multiple times during the pulse chirp duration D. The number of temporal samples per chip duration affects the down-range extent. The number is often a practical consideration chosen based on chirp repetition rate and available camera frame rate. The frame rate is the sampling bandwidth, often called "digitizer frequency.". Basically, if X number of detector array frames are collected during a chirp with resolution bins of Y range width, then a X*Y range extent can be observed. The acquired data is made available to a processing system 250, such as a computer system described below with reference to FIG. 10, or a chip set described below with reference to FIG. 11. A 3D-HAL module determines the digital model of the target based on the acquired data. Any known apparatus or system may be used to implement the laser source 212, frequency modulator 214, beam splitter 216, reference path 220, detector array 230, or acquisition system 240. Optical coupling to flood or focus on the target or focus past the pupil plane are not depicted.

For example, in some embodiments, the laser used was actively linearized with the modulation applied to the current driving the laser. Experiments were also performed with electro-optic modulators providing the modulation. The system is configured to produce a chirp of bandwidth B and duration D, suitable for the down-range resolution desired, as described in more detail below for various embodiments. For example, in some illustrated embodiments, a value of B about 90 GHz and D of about 200 ms were chosen to work within the confines of the relatively low detector array frame rate in the experiments performed. These choices were made to observe a reasonably large range window of about 30 cm, which is often important in shape of an object and identification of the object. Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Aperture synthesis depends on translation between the speckle field, that is, g0 the interference pattern of the backscattered light with the reference beam, and the receive aperture in the aperture plane, which in this depicted configuration is also the pupil place. A multitude of configurations achieve this effect. In the example analysis, the transceiver locations 130 are located and it is assumed that the transmitter moves with the fast FPA in a monostatic configuration (both transmitter and receivers moving together). However, this assumption is not required as bi-static (one is stationary and the other moving relative to the target) and multi-static (both moving relative to the target or several detectors or transmitters moving separately) configurations are also possible. The spatial relationship between transmitter and receiver does not have to be known to form imagery. However, knowledge of the spatial relationship can help in processing and interpreting the image. The synthetic aperture size, $d_{SA}$ 123, is shown and the enhanced cross-range resolution is nominally given by Equation 2

$$\delta_{CR}=\lambda R/(2d_{SA}+d_{AP}) \qquad (2)$$

where $\lambda$ is the carrier wavelength, R is the range to target, $d_{AP}$ is the focal plane array width in the dimension of travel, and the step size is assumed to be $d_{AP}/2$.

Figure 3:
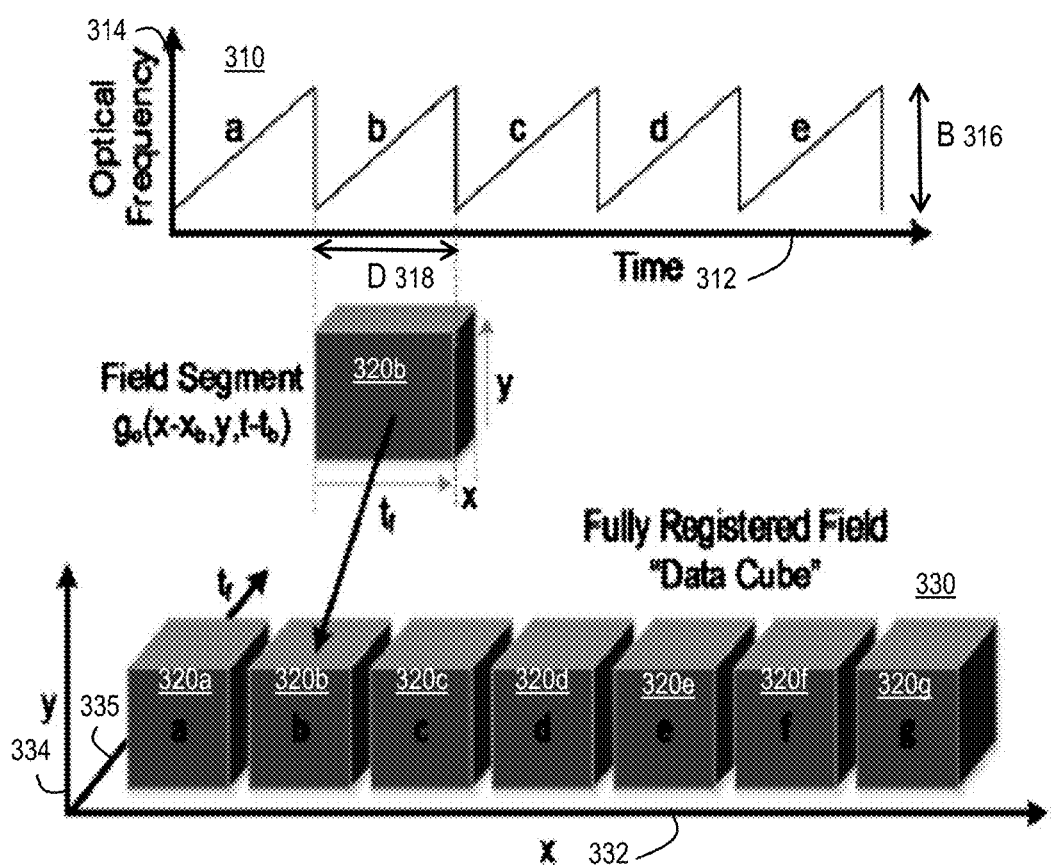
FIG. 3 is a block diagram that illustrates example processing of data from operation of a high resolution 3D LADAR system, according to an embodiment.

FIG. 3 is a block diagram that illustrates example processing of data from operation of a high resolution 3D LADAR system, according to an embodiment. FIG. 3 shows the corresponding sequence of chirp waveforms. In graph 310, the horizontal axis 312 indicates time increasing to the right in arbitrary units; and, the vertical axis 314 indicates optical frequency in the target beam, increasing upward in arbitrary units. At each aperture location 130 along the line of platform motion, a chirp is emitted with duration D 318 and bandwidth B 316. An example recorded field segment for aperture location "b" is drawn as a small cube 320*b*. It is important to note that the fast FPA samples the field spatially at the pixel spacing in the aperture plane, while the frame rate of the fast FPA gives the temporal sampling rate that provides the down-rang information. The pixel spacing sets the overall field-of-view of the system in the cross-range dimensions, while the frame rate is proportional to the maximum range difference that can be measured in the down-range dimension.

Each recorded field segment 320*a* through 320*g* is subsequently synthesized during a post-processing step with the other field segments, resulting in a larger synthesized or fully registered field estimate as shown graph 330. The horizontal axis 332 indicates distance x in the direction of platform motion; the vertical axis 334 indicates distance y in the perpendicular cross-range direction; and, the third axis 335 indicates samples in the time domain that indicates down-range distance. If the field segments overlap in the direction of platform motion, then the overlap provides advantages for registering the cubes to each other spatially. This synthesized segments structure is call a "data cube" herein. Synthesizing can either be performed by measuring the aperture positions with high precision or by using data driven registration techniques with sufficient overlap between field segments. Even after registration, the field segments typically remain incoherent with each other because the aperture motion must technically be compensated to less than the optical carrier wavelength, which is often not physically possible. Phase gradient autofocus or prominent point algorithms provide coherence across field segments and the data can be further enhanced using digital image correction for atmospheric or other aberrations using any method known at the time the process is implemented.

By transforming the whole data cube, with a 3D FFT, all dimensions are compressed into a fully resolved 3D distribution. Once fully compressed, peak extraction is performed along the downrange dimension to construct a point cloud. The 3D FFT generates a 3D array where the magnitude at each array element represents the amount of energy reflected from that point in space. To extract the 3D data from this 3D array for point cloud visualization purposes, the 1-D array existing at each transverse locations (other 2 dimensions) in this 3D array was analyzed. The analysis of the 1-D array located and fit any peaks present. These were logged as 3D points in the point cloud.

FIG. 4 is a flow diagram that illustrates an example method of using a high resolution 3D LADAR system, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401, a transceiver is configured to transmit a frequency modulated continuous wave (FMCW) laser beam with bandwidth B and duration D, called a laser chirp, and to receive in a spatial array of one or more optical detectors arranged in a plane perpendicular to the transmit beam at a temporal sampling rate, called a "fast frame rate," that is short compared to the duration D of the chirp. The bandwidth B is chosen to resolve the down-range features of the desired target according to Equation 1 and the duration is chosen to be short compared to the time for the platform to travel a distance on the order of the width of the array of detectors in the direction of travel, $d_{AP}$, if any. The transceiver is also configured to produce a reference laser chirp to interfere with the returned signal at the detector array, e.g., using any of the methods described above. This provides highly precise phase information.

In step 411, it is determine whether some condition is satisfied to take the next sample of the target, where a sample includes the full laser chirp and the fast frame rate temporal sampling of the return to provide a full field segment. In some embodiments, the condition is that the platform has moved a distance on the order of the $d_{PA}$ (or about half that distance to provide for overlap that is useful in registering the successive field segments). In some embodiments in which a stationary array is observing a rotating target, the condition is that the target has rotated a circumferential distance of about $d_{PA}$ (or about half of that). In some embodiments in which a stationary array is observing a series of items on an assembly line, the condition is that the target reached a position on the assembly line for imaging. In some embodiments, in which a fixed array is observing a target subjected to some environmental stress, the condition is that sufficient time has passed to achieve a noticeable effect from the stress or that some environmental parameter has reached a certain value. If the condition for another sample has not been satisfied, control passes to step 413 to move the platform the desired distance or wait for the desired time or for the desired environmental parameter value. In some embodiments, steps 411 and 413 is performed by a hardware controller for the laser source; and, in some embodiments, steps 411 and 413 is performed by a general purpose processor programmed to control the laser source. Control then passes back to step 411.

In some embodiments, novel steps were developed to accumulate useful samples during step 413. For example, in some embodiments when there is no physical motion of the aperture, the receiver array "motion" is achieved by shifting a sub-region (e.g., 200×280 pixels out of a 1000×1960 pixel≈2 Megapixel camera) of the camera array which was actively being sampled. This offers an advantage because only collecting data from a sub-set of a camera array can allow faster frame rates. In some embodiments, the speckle averaging is achieved by rotating the target (which causes a translation of the speckle field incident on the detector array) by an amount desired to get a new speckle realization. An entirely new data set was then collected. The speckle averaging was performed by incoherently summing (amplitude not phase) the 3D resolved data cube prior to point cloud extraction. The use of multiple imaging modes (aperture translation, target rotation) to achieve independent speckle observations for incoherent averaging offers the advantage of reduced noise in the point cloud. Thus, in some embodiments, this step includes synthesizing the first data by, for each synthesized set, selecting a plurality of subsets of the first data, synthesizing each subset separately to produce a synthesized subset and incoherently combining the plurality of synthesized subsets If it is determined in step 411 that the condition is satisfied to take the next sample of the target, then control passes to step 421 to use the laser source to illuminate the target with a laser chirp for the chirp duration. In some embodiments, step 421 or a portion thereof is performed by a hardware controller for the laser source; and, in some embodiments, step 421 or a portion thereof is performed by a general purpose processor programmed to control the laser source.

In step 423, a complex waveform is received at the one or more detectors in the detector array at the fast frame rate. The complex waveform indicates both the amplitude and phase of the difference between the returned signal from the target and a reference signal based on the laser chirp, e.g., in heterodyne interference. In some embodiments, step 423 also determines a range R to the target by determining the travel time from the time of transmission of the first laser chirp to the time of receipt of the first received laser chirp. In some embodiments, this range is used to set the delay time in the reference path 220 for the reference laser chirp for subsequent measurements of the complex field $g_0(x, y, t_f)$. Step 423 is performed by the detector array, such as a fast FPA. In some embodiments, a portion of step 423 is performed by a hardwired or programmable data acquisition system.

In step 425, the 3D field segment, i.e., $g_0(x, y, t_f)$, is stored for the current chirp in the current sampling event. In some embodiments, the data is natively 8-bit. Loading everything into memory and doing a three dimensional fast Fourier Transform (3D-FFT), which is a well-known digital procedure, would produce an array of 64 bit values (an 8-fold increase in data load!) Therefore it is advantageous to do the 3D FFT on only one or two dimensions at a time while only loading portions of the data cube relevant for a particular step. Thus it is advantageous to store the 3D cube elements in order of one dimension at a at time. In some embodiments, step 425 or a portion thereof is performed by a hardware acquisition system; and, in some embodiments, step 425 or a portion thereof is performed by a general purpose processor programmed to perform data acquisition.

In step 427, it is determined whether there is another sample to be taken. If so, control passes back to step 411 and following steps, described above. If not, control passes to step 431. In some embodiments, step 427 or a portion thereof is performed by a hardware controller for the laser source; and, in some embodiments, step 427 or a portion thereof is performed by a general purpose processor programmed to control the laser source. Thus step 427 includes repeating steps 421 and 423 for multiple sampling conditions. In some embodiments, the array of one or more optical detectors is a subset of pixels in a digital camera. This offers the advantage of using commercial off the shelf components that are much cheaper than an array of optical detectors of other types. Such pixels are adequate in the various example embodiments described below, because the capture electronics can be concentrated on fewer pixels, thus allowing a frame rate for the subset of pixels to be greater than a frame rate for all the pixels in the digital camera. In these embodiments, repeating steps 421 and 423 for the multiple sampling conditions includes repeating steps 421 and 423 for multiple different subsets of the pixels in the digital camera.

In step 431, multiple 3D field segments are synthesized using a processor. In some embodiments, the field segments have fewer than three dimensions, e.g., when a single detector or a 1D array of detectors is used. Any conventional registration and synthesizing methods may be used. As indicated above, in some embodiments, the segments being aperture synthesized are multiple subsets of pixels (regions of interest) of a digital camera. The no-physical motion aspect of the aperture synthesis is new. In prior attempts to expand HAL to three dimensions, as far as is known to the authors, nobody really thought to use a camera with subsets of pixels (regions of interest) as the detector array combined with an aperture synthesis tool.

In some embodiments, novel methods are used for registering or synthesizing the 3D segments. In some embodiments, spatial registration is not needed because a fixed array is used with a stationary source, e.g., to watch the effects on an object of changes in values of one or more environmental parameters like temperature, pressure, chemical exposures; so spatial registration is assured by the physical configuration. In other embodiments, registration is desirable and involves a similarity measure, such as cross-correlation, of speckle fields to correctly register the segments. In some embodiments phasing of segments is done for both transverse dimension by performing a ranging Fast Fourier Transform (FFT, a well known digital technique) of a particular down-range segment (e.g., FFT the range dimension of the 3D array for the segment). The phase at a chosen range bin containing a bright point (or retro-reflector) in the scene is then extracted for each transverse coordinate and this phase is removed from the segment at all range bins for each transverse coordinate. This process is repeated across all segments so the particular range bin always has zero phase at all transverse coordinates. Thus the various segments are phased in two transverse dimensions. This causes the finally resolved scene to be centered on the particular bright point feature in 3D coordinate space; but, this situation is easily corrected by an appropriate circular shift of the transverse array coordinates.

In some embodiments, 3D images are compared under different conditions and the synthesizing is done for different sets of the field segments, i.e., one set of field segments are synthesized to produce one 3D rendering of an object under one set of conditions and another different set of field segments are synthesized to produce another 3D rendering of the object under a different set of condition. For example, as shown in more detail below, a coffee mug is compared before and after pouring in hot water, in order to show thermal expansion in a portion of the cup. Another example is when a symmetric object is being manufactured, asymmetries can be discovered by synthesizing one set of field segments representing one side of the object and a different set of field segments for a different side. If the different 3D renderings that result from the different sets show differences, then deviations from the desired symmetry have been exposed.

In step 433, a 3D Fourier transform is performed on at least one set of the synthesized 3D field segments. By virtue of step 433, the technique offers un-ambiguous resolution of returns in all 3 dimensions. This offers unforeseen advantages over other attempts to expand both SAL and HAL to three dimensions. Prior attempts to expand both SAL and HAL had issues with phase wrapping and had to make some simplifying assumptions about the number of surfaces they are able to resolve in the "third dimension"—usually just 1 surface. There is never a claim of full, Fourier limited, resolution of whatever may happen to be in any of the three dimensions. Thus the type of target is not limited, or prior knowledge is not required, for the new techniques presented here. The method using the 3D fourier Transform can resolve targets that those prior techniques cannot resolve. People struggled with trying to get 3D data out of HAL for a while (more of a research area than 3D w/SAL).

As mentioned above, it is advantageous to do a 3D FFT on only one or two dimensions at a time while only loading portions of the data cube relevant for a particular step. Thus the data were stored efficiently for this purpose in step 425. In step 433, as the FFT of the first dimension goes from real valued input data to complex valued data, this produces a 2-sided result. It is again advantageous to delete the redundant half of this data to minimize data overhead. For proper phase extraction, it is still further advantageous to interpolate the peak using a zero-padded FFT approach. Therefore, the range dimension was subjected to a FFT last, one pair of transverse coordinates at a time. Commercial software can be used to implement the 3D-FFT. For example, in an illustrated embodiment, the FFT function fft(Array,[ ],n) available in MATLAB™, from MATHWORKS™ of Natick Mass., was used, where n specifies the dimension and Array is a data array with at least a portion of the 3D cube undergoing the transform. As pointed out above, the transform was performed repeatedly, one dimension at a time, with care to save memory resources. Thus, in some embodiments, this step includes performing a 3D Fourier transform of each synthesized by performing a one dimensional Fourier Transform of each dimension separately and combining results from all dimensions.

In step 435, a digital representation, also called a digital model, of the target is generated based on the 3D Fourier transform. For example, as described above, a point cloud is extracted from the transformed speckle field using one dimensional (1D) range analysis (per transvers coordinate) with a peak-finding fitting algorithm. The peak fits were done with a 3-point Gaussian fit method, which is efficient relative to a nonlinear fit routine, because so many peaks had to be found (up to about one million peaks per image). This made the extraction of good down-range precision much faster. The above processing was done in the native coordinates provided by the array indexing. The array coordinates are translated into target spatial coordinates depending on the dimension. Down-range coordinates were determined by multiplying by c/2B. Cross-range coordinates were determined by multiplying by $\delta_{CR}=\lambda R/(2d_{SA}+d_{AP})$. The size of the aperture was calculated by multiplying the number of samples (in either cross range dimension) by the pixel pitch of the detector array.

In step 437, a display device is operated based on the digital representation of the target. In various embodiments, the digital model is a point cloud and the display device is a screen that displays the point cloud, or a system configured to render a surface from a point cloud. In various embodiments, the display device is either a system, such as a surveillance system, configured to identify an object based on the digital model, or a system, such as a robot, configured to operate on the target based on the digital model, or both.

High resolution 3D LADAR, and in particular 3D-HAL, relies upon a parallel readout architecture, it has advantages similar to direct-detect flash LADAR systems. However, because the approach is coherent, it has many additional capabilities including: 1) enhanced cross-range resolution through aperture synthesis approaches; 2) access to ultra-high downrange resolution through stretched processing of chirped waveforms; 3) the ability to utilize digital phase correction and image sharpness metrics for correcting optical or atmospheric aberrations; and 4) advanced Doppler or interferometric processing to measure the coherent evolution of the 3D point cloud. The 3D-HAL approach also uses heterodyne detection, which is extremely sensitive when shot-noise-limited, and which enables coherent integration to increase carrier-to-noise ratios. This makes 3D-HAL ideally suited for use in photon-starved environments typical of flash LADAR.

The use of coherent downrange waveforms provides unprecedented extraction of 3D content. These 3D images are fully resolved and will perform better at 3D imaging targets with significant structure or discontinuities when compared to multi-wavelength HAL or multi-baseline SAL approaches.

2. EXAMPLE EMBODIMENTS

2.1 Simulated Embodiments

An advanced 3D-HAL model was developed to simulate a variety of system architectures. Platform motion and/or target rotation has been incorporated for aperture synthesis.

To demonstrate resolution enhancement, in one embodiment, a 3D-HAL system was simulated to measure an AF bar target from a standoff distance of 2 kilometers (km, 1 km=$10^3$ meters). The bars target included a series of horizontal and vertical bars of brushed aluminum on a plane sloped at about 45 degrees. The bars range in diameter from about 0.05 to 0.5 meters and in length from about 0.4 to about 4 meters. The target also includes the same material shaped into the numerals 0 and 1 arranged both horizontally and vertically, and also shaped into letters and numerals spelling out "USAF 1951 1X." The numerals and letters are of similar sizes.

Figure 5A:
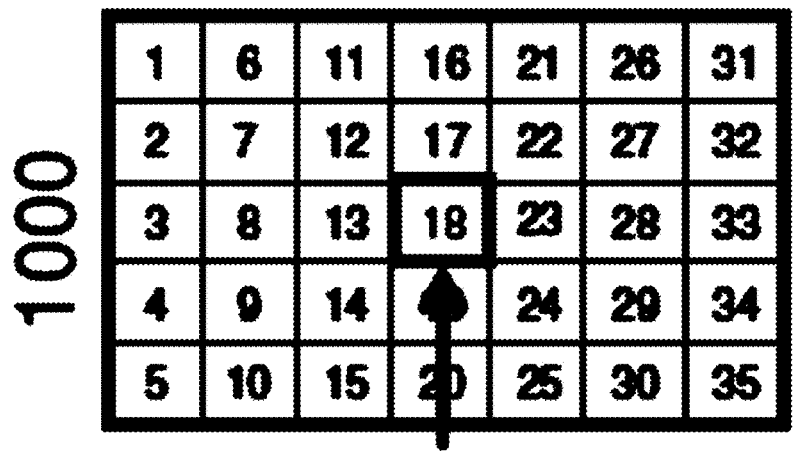
FIG. 5A is a block diagram that illustrates an example 2D array of optical detectors forming a 2D synthetic aperture, according to an embodiment.

The fast FPA was assumed to be 200×280 pixels wide with a pixel spacing of 1.25 mm. Thirty-five total aperture locations were simulated with an aperture gain of 5 times in the vertical dimension and 7 times in the horizontal dimension in the plane perpendicular to the range to the target. This corresponds to using a sliding window of pixels in a commercial 2 Megabyte digital camera. FIG. 5A is a block diagram that illustrates an example 2D array of optical detectors forming a 2D synthetic aperture, according to an embodiment. One pupil-plane field segment includes 200 by 280 pixels and the 5×7 grid of segments visited at different times, each time subjected to one laser chirp, produces the synthetic array of 1000 vertical pixels by 1960 horizontal pixels. No registration was needed because the data were actually collected on the 1000×1960 pixel array. In some simulated embodiments, simulated positional uncertainty is added and scene or speckle or overlap registration is used. Each tile was collected at a different time, serially, with B≈90 GHz, D≈200 ms, and a 5 Hz chirp repetition rate.

Figure 5B:
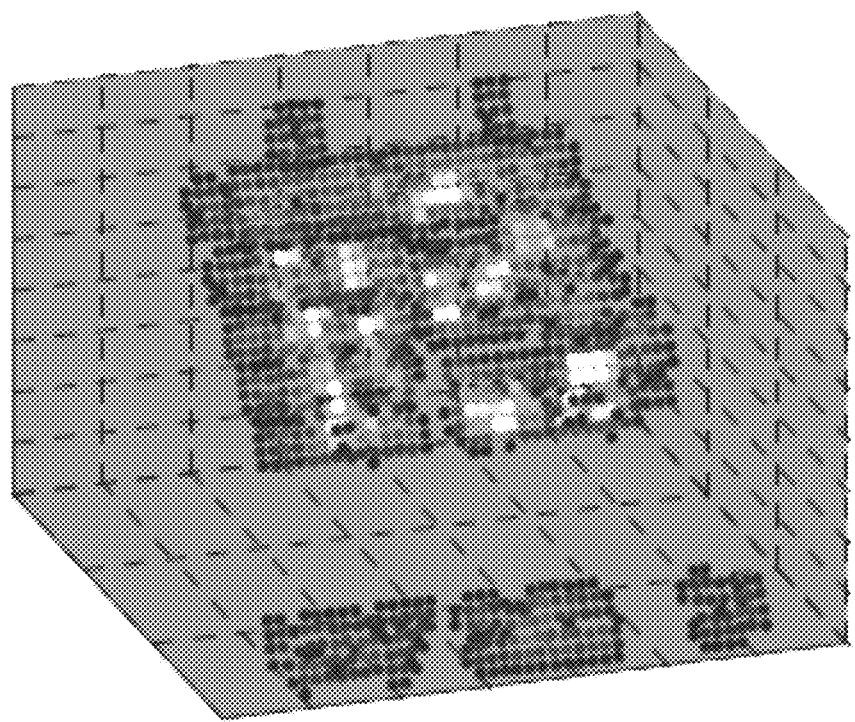
FIG. 5B is a plot that illustrates an example 3D image using a single instance of the 2D array of FIG. 5A, according to an embodiment.
Figure 5C:
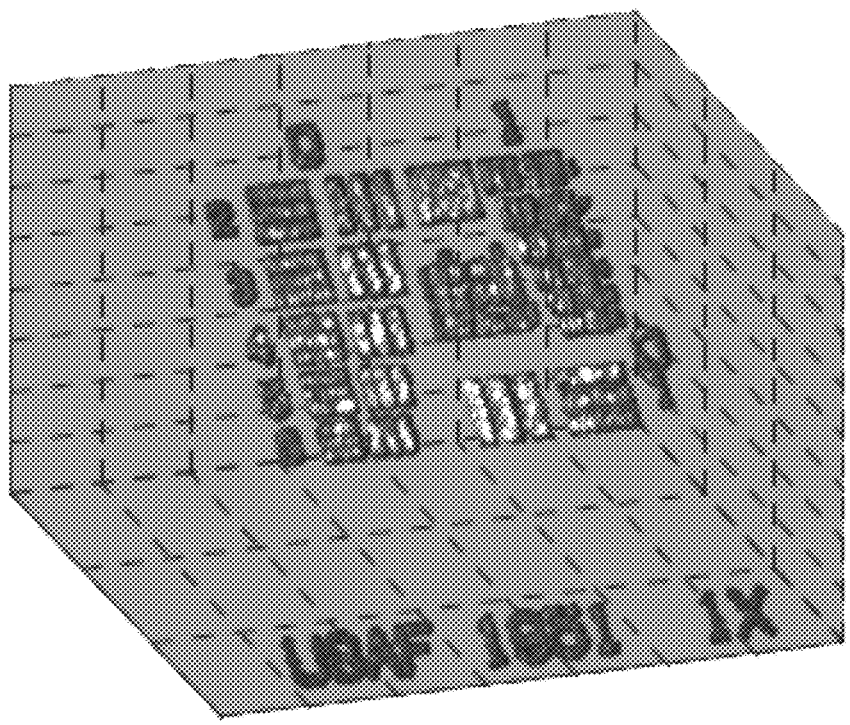
FIG. 5C is a plot that illustrates an example 3D image using multiple instances of the 2D array of FIG. 5A in a synthetic aperture, according to an embodiment.

FIG. 5B is a plot that illustrates an example 3D image using a single instance of the 2D array of FIG. 5A, according to an embodiment. Thus this shows a 3D rendering for a single pupil-plane segment. Individual bars are not resolved and no letters or numerals are recognizable. FIG. 5C is a plot that illustrates an example 3D image using multiple instances of the 2D array of FIG. 5A in a synthetic aperture, according to an embodiment. Thus this shows the full aperture synthesis and demonstrates the anticipated resolution enhancement in both transverse dimensions. Individual bars are resolved and both letters and numerals are recognizable with good depth resolution commensurate with the enhanced horizontal resolution, showing the efficacy of the 3D LADAR approach.

2.2 Experimental Embodiments

D-HAL demonstrations were conducted using a lens-less digital holographic setup. A stabilized FMCW linear-chirp laser centered at a carrier wavelength of 1064 nanometers (nm, 1 nm=$10^{-9}$ meters) was used to flood illuminate various targets 2.5 meters away, each of which was mounted on a rotary stage. The laser output power was approximately 15 milliWatts (mW, 1 mW=$10^{-3}$ watts). The linear chirp had a bandwidth of 102 GHz and was repeated at a 5 Hz rate (i.e., the chirp had a duration D of 0.2 seconds=200 milliseconds, ms, 1 ms=$10^{-3}$ seconds). This laser was an SLM-L Source, available from BRIDGER PHOTONICS™, Bozeman, Mont. Such chirps also have been demonstrated in various publications, such as Krause et al., 2012, Satyan et al., 2009, and Kewitsch, et al., 2006.

A mirror near the target was used as reference path 220 to create a local oscillator beam as the reference beam 207b. A Basler acA2000-340 km CMOS array used in many digital cameras served as detector array 230 and recorded the interference between the reference beam and the target returns synchronized with the chirp output. While the CMOS array included 1000×1960 pixels, only a 200×280 pixel region of interest was sampled during any 200 ms sampling period, i.e., duration D. A Bitflow Karbon frame grabber card was used to capture the 200×280 pixel region-of-interest (ROI) at a frame rate of 1.8 kHz—much faster than a frame rate needed to capture the almost 2 million pixels of the entire array. The 2D synthesis accounts for the different time each different 200×280 pixel subset was sampled. Thus, each resulting field segment had 360 frames in fast time and was 200 ms in duration. The target was stationary during the entire capture of the 1000×1960 pixel image set (taken in 200×280 pixel segments serially). Then the target was rotated to get a new speckle realization and the full capture process was again repeated.

The ROI was shifted to each of the 35 non-overlapping positions on the 1000×1960 CMOS array, similar to the tiles depicted in FIG. 5A, in order to simulate synthetic aperture. This is effectively a bi-static mode with a moving receive aperture and stationary transmitter both with fixed pointing. The bi-static mode halves the synthetic aperture and doubles the resolution. However, the stationary fast FPA results in ideal spatial placement of the field segments and simplifies the processing so spatial registration is not needed. The resultant voxel is 1.5 mm×968 µm×494 µm.

The tiles produce segments that are subjected to piston phasing, as described here, achieved with a ball lens retro-reflector. A N-BK7 index 2.0 ball lens (available from EDMOND OPTICS INC.™ of Barrington, N.J.) was placed in the scene to provide strong reflection. The phase on the return from this reflection was then analyzed to provide segment to segment phase offset compensation via digital processing. Given the pulse repetition frequency of 5 Hz (chirp duration of 200 ms), the collection time of a data cube is roughly 7 seconds. Several data cubes can allow for coherent integration of the time domain signal for increased SNR. The segments are coherently added (3D Array sum of complex values in amplitude and phase) after piston phase removal (described above). The coherent summation increases signal to noise ratio (SNR). Equation for N samples of a given segment would be $$\text{Segment}_{coherent\ sum} = \text{Segment}_{sample1} + \text{Segment}_{sample2} + \ldots + \text{Segment}_{sampleN}$$

Where the "+" is an elementwise addition of complex numbers.

A rotary stage rotated the target by the angle subtended by the FPA from the target to achieve an independent speckle realization. When the target is rotated to provide a new speckle realization, the portions of the target which are not on the rotation axis (most of it) translate in range and cross range slightly—an effect called surface migration. Due to the small amount of rotation however, this surface migration was much less than a resolution bin and was therefore negligible in the experimental embodiment.

The data shown below are derived from four speckle realizations of the full data cube. Though target rotation has been successfully used for aperture synthesis, the additional information for speckle averaging was used to improve image contrast. For example, with target rotation, the associated speckle field translation could have been used for aperture synthesis. This would have involved actual algorithmic field registration, which would have led to higher cross-range resolution in the dimension of the aperture synthesis. However, as the imaging technique is coherent, there is speckle induced range noise and intensity noise. Thus use of the target rotation to achieve independent estimates of the speckle fields and subsequent speckle averaging was deemed to improve the overall image quality more favorably, with smoother, more consistent intensity, than the image quality attained with improved cross-range resolution via aperture synthesis.

2.2.1 Experimental Rendering of Sheet Surface

Figure 6A:
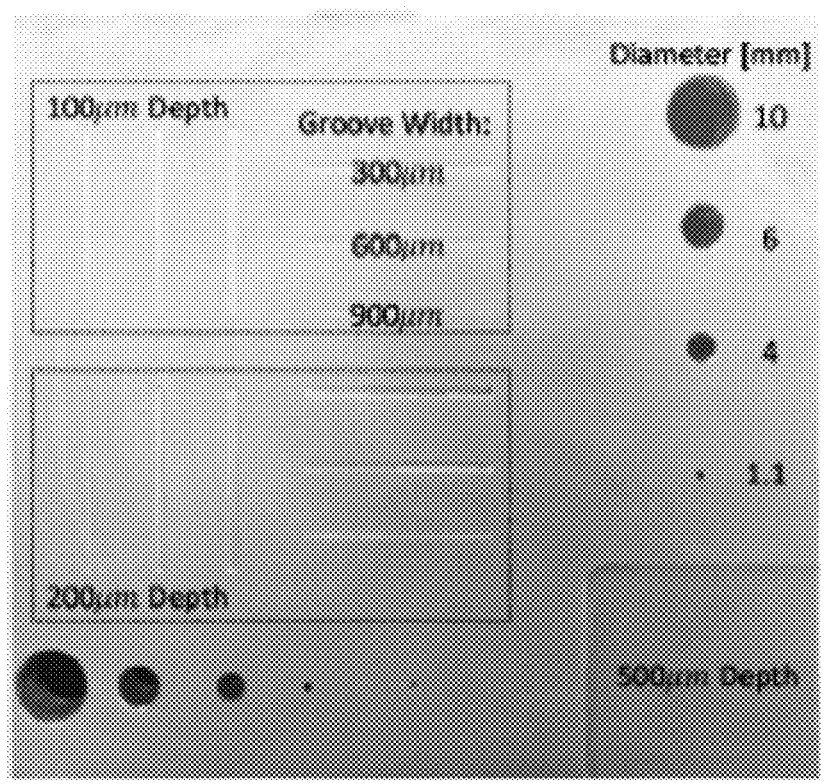
FIG. 6A is a photograph that illustrates an example surface used as a target, according to an embodiment.
Figure 6B:
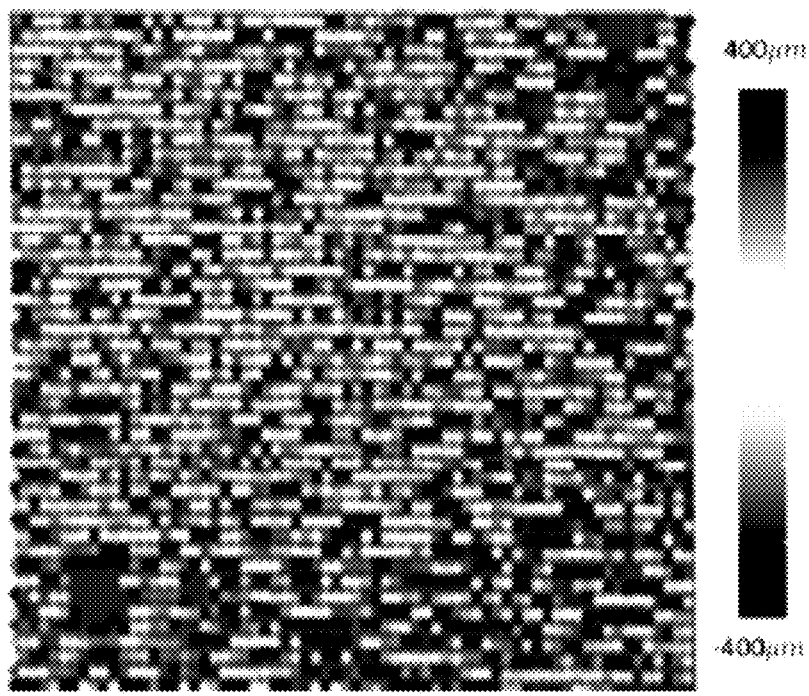
FIG. 6B is a plot that illustrates an example 3D model of the surface of FIG. 6A using a single instance of a 2D array, according to an embodiment.
Figure 6C:
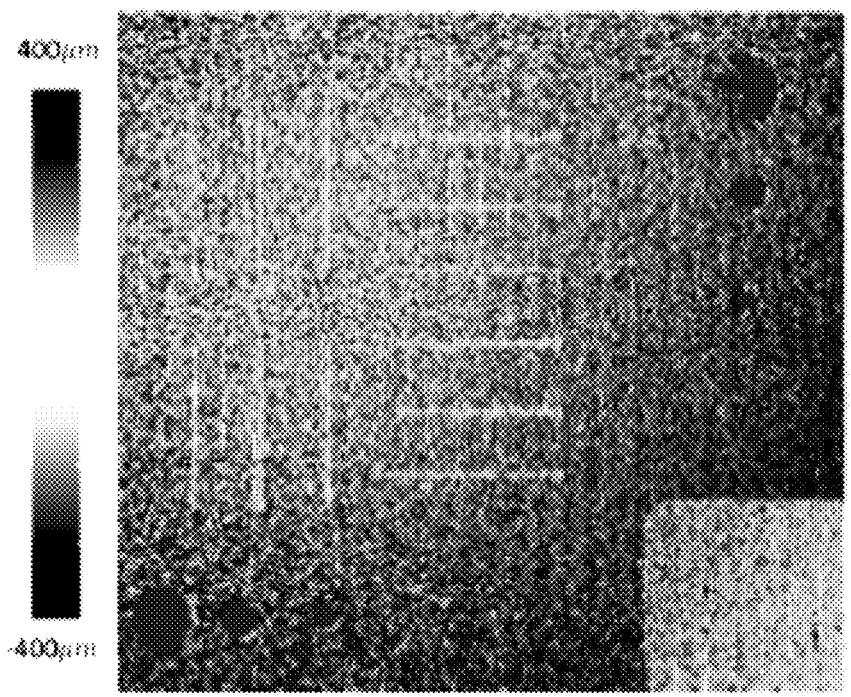
FIG. 6C is a plot that illustrates an example 3D model of the surface of FIG. 6A using multiple instances of the 2D array in a synthetic aperture, according to an embodiment.

To demonstrate down-range resolution enhancement, a satin finished aluminum plate with precision machined features was imaged. FIG. 6A is a photograph that illustrates an example surface used as a target, according to an embodiment. The machined features included vertical and horizontal grooves at three different widths (300, 600, and 900 µm) and two different depths (100 and 200 µm). A corner of the aluminum plate was removed at a depth of 500 µm to assess the "step" resolution of the system. Holes of varying diameters (1, 4, 6 and 10 mm) were also drilled through the plate. The 3D image was formed using a single field segment as well as the entire coherently stitched array to demonstrate the resolution enhancement capability. FIG. 6B is a plot that illustrates an example 3D image of the surface of FIG. 6A using a single instance of a 2D array, according to an embodiment. The depth to the point cloud is indicated by grey-shading. Individual features are not recognizable. FIG. 6C is a plot that illustrates an example 3D image of the surface of FIG. 6A using multiple instances of the 2D array in a synthetic aperture, according to an embodiment. The point cloud derived from processing of the fully synthesized aperture of size 1000×1960 with depth out of the plane given by greyscale. The visualization shows the cross range resolution enhancement of the stitched field versus the single segment. The features and quantitative estimates of depth ae recognizable.

2.2.2 Experimental Rendering of Razor

Figure 7A:
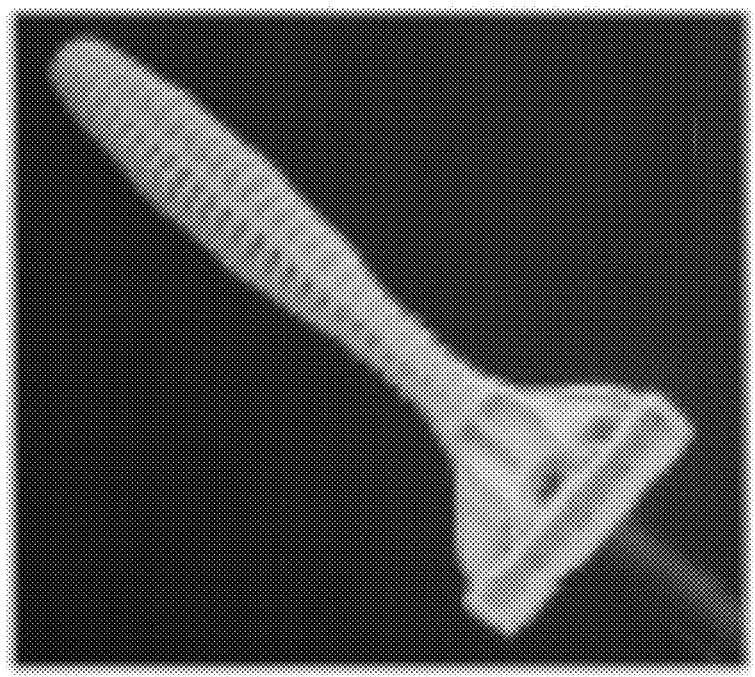
FIG. 7A is a photograph that illustrates an example object used as a target, according to an embodiment.
Figure 7B:
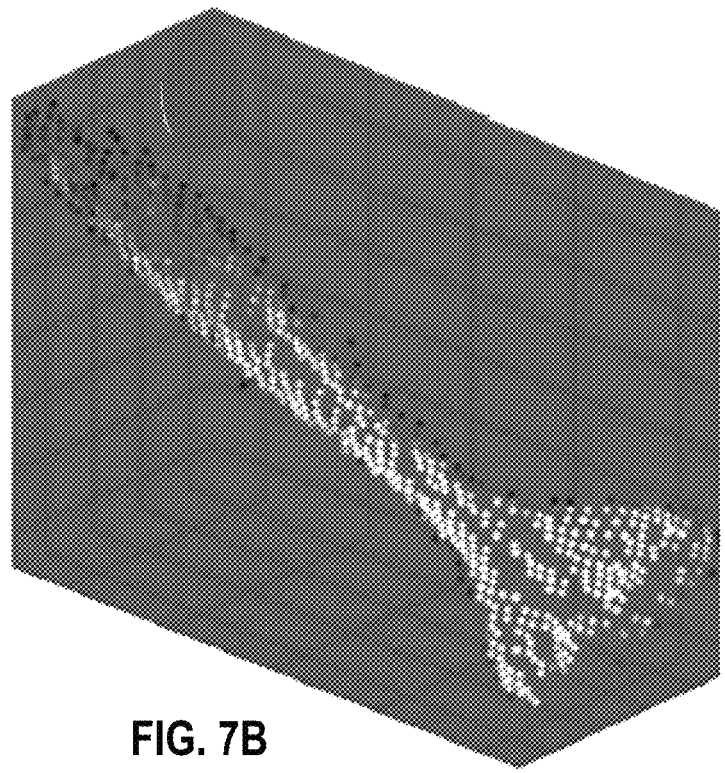
FIG. 7B is a plot that illustrates an example 3D model of the object of FIG. 7A using a single instance of a 2D array, according to an embodiment.
Figure 7C:
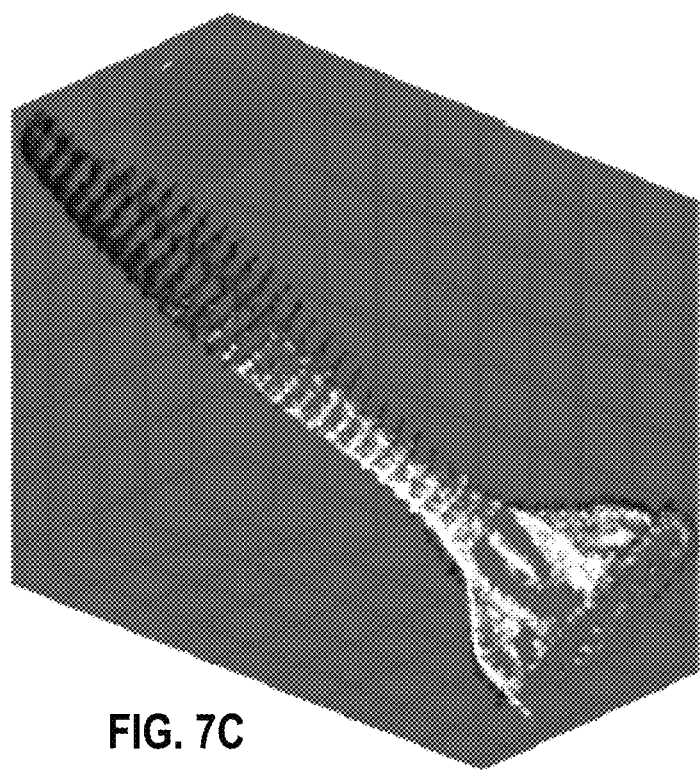
FIG. 7C is a plot that illustrates an example 3D model of the object of FIG. 7A using multiple instances of the 2D array in a synthetic aperture, according to an embodiment.

FIG. 7A is a photograph that illustrates an example object used as a target, according to an embodiment. This shaving razor target was chosen to provide different material and shape characteristics using a familiar object. FIG. 7B is a plot that illustrates an example 3D image of the object of FIG. 7A using a single instance of a 2D array, according to an embodiment. This shows the single field segment. FIG. 7C is a plot that illustrates an example 3D image of the object of FIG. 7A using multiple instances of the 2D array in a synthetic aperture, according to an embodiment. This shows the fully synthesized aperture 3D-HAL imagery rendered with log scale intensity shading. The synthetic point clouds provide more detail, allowing for example the grip on the razor to be resolved.

2.2.3 Experimental Rendering of Cup and Straw

Figure 8A:
FIG. 8A is a photograph that illustrates another example object used as a target, according to an embodiment.
Figure 8B:
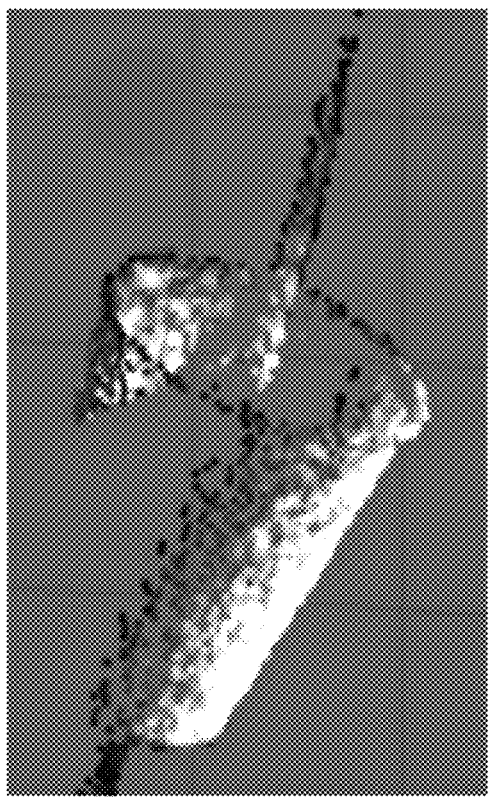
FIG. 8B is a plot that illustrates an example 3D model of the object of FIG. 8A using a single instance of a 2D array, according to an embodiment.
Figure 8C:
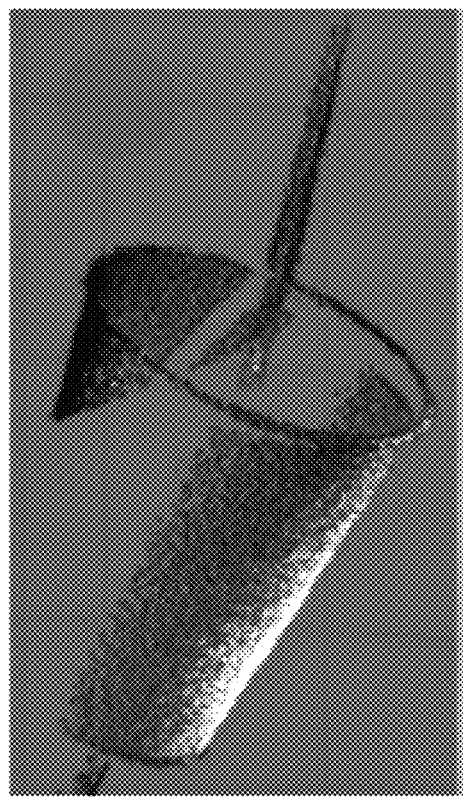
FIG. 8C is a plot that illustrates an example 3D model of the object of FIG. 8A using multiple instances of the 2D array in a synthetic aperture, according to an embodiment.

FIG. 8A is a photograph that illustrates another example object used as a target, according to an embodiment. This 12 once paper cup ad straw target was chosen to provide different material and shape characteristics using another familiar object. FIG. 8B is a plot that illustrates an example 3D image of the object of FIG. 8A using a single instance of a 2D array, according to an embodiment. FIG. 8C is a plot that illustrates an example 3D image of the object of FIG. 8A using multiple instances of the 2D array in a synthetic aperture, according to an embodiment.

2.2.4 Experimental Detection of Thermal Stress

Figure 9A:
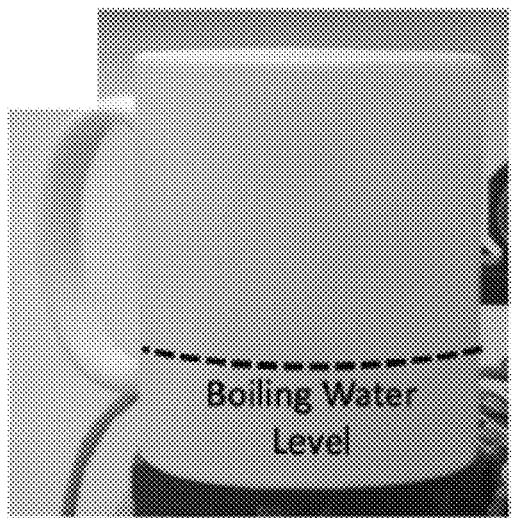
FIG. 9A is a photograph that illustrates another example object used as a target, according to an embodiment.

To fully demonstrate the coherent nature of point clouds rendered with the 3D-HAL approach, the phase information of the various points was tracked over sequential captures. Because this phase is proportional to the wavelength of the optical carrier, very small scale changes can be observed and mapped to the 3D rendering. FIG. 9A is a photograph that illustrates another example object used as a target, according to an embodiment. To explore this capability, the thermal expansion of a coffee cup in the seconds after hot water was introduced into the container was imaged. FIG. 9A show the coffee mug and the boiling water level.

The ROI was fixed at 400×560 pixels, with 2×2 binning, resulting in a narrower field-of-view, which allowed a 5 Hz frame rate. The phase value of each voxel over the sequential capture was then referenced to the phase of the identical voxel in the first capture. This phase was unwrapped and rendered onto a surface reconstruction of the point cloud to visualize thermal expansion of the mug on the micron scale.

Figure 9B:
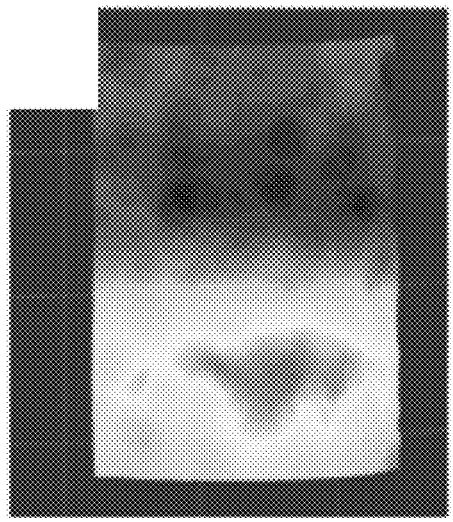
FIG. 9B is an image that illustrates an example distribution of differences in the object of FIG. 9A at different times due to different environmental conditions, according to an embodiment.
Figure 9C:
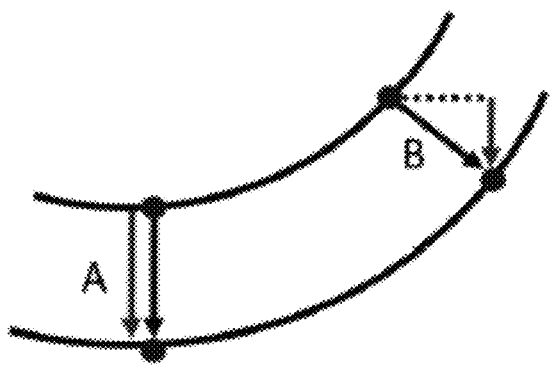
FIG. 9C is a plot that illustrates components of expansion toward and away from an array of optical detectors, according to an embodiment.

The results are shown in FIG. 9B. FIG. 9B is an image that illustrates an example distribution of differences in the object of FIG. 9A at different times due to different environmental conditions, according to an embodiment. A grayscale of the unwrapped phase after 60 seconds is renders rendered onto the point cloud representing the surface of the mug. The observed phase evolution demonstrates that more thermal expansion is occurring in the bottom half of the mug where the hot water is present. In order to correctly utilize this phase to measure displacement, the surface normal is estimated and compared to the line of sight of the 3D-HAL system as shown in FIG. 9C. FIG. 9C is a plot that illustrates components of expansion toward and away from an array of optical detectors, according to an embodiment.

Figure 9D:
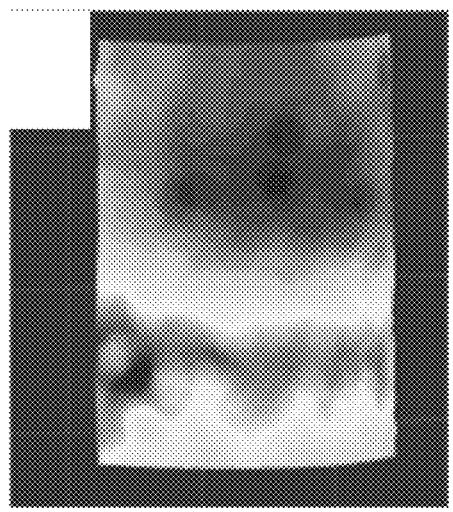
FIG. 9D is an image that illustrates an example distribution of differences in the object of FIG. 9A at different times due to different environmental conditions corrected for assumed direction of expansion, according to an embodiment.

The observed phase change is proportional to the downward pointing arrows, which represent the dot product of the thermal expansion (exaggerated) indicated by the lettered arrows A and B along the line of sight of the 3D-HAL system. By taking this projection into account, an estimate of the displacement can be made. FIG. 9D is an image that illustrates an example distribution of differences in the object of FIG. 9A at different times due to different environmental conditions corrected for assumed direction of expansion, according to an embodiment. As can be seen thermal expansion occurs along he entire band below the surface of the boiling water. The fully coherent nature of the point clouds is demonstrated by such tracking of the phase of a thermally expanding coffee cup.

3. COMPUTATIONAL HARDWARE OVERVIEW

Figure 10:
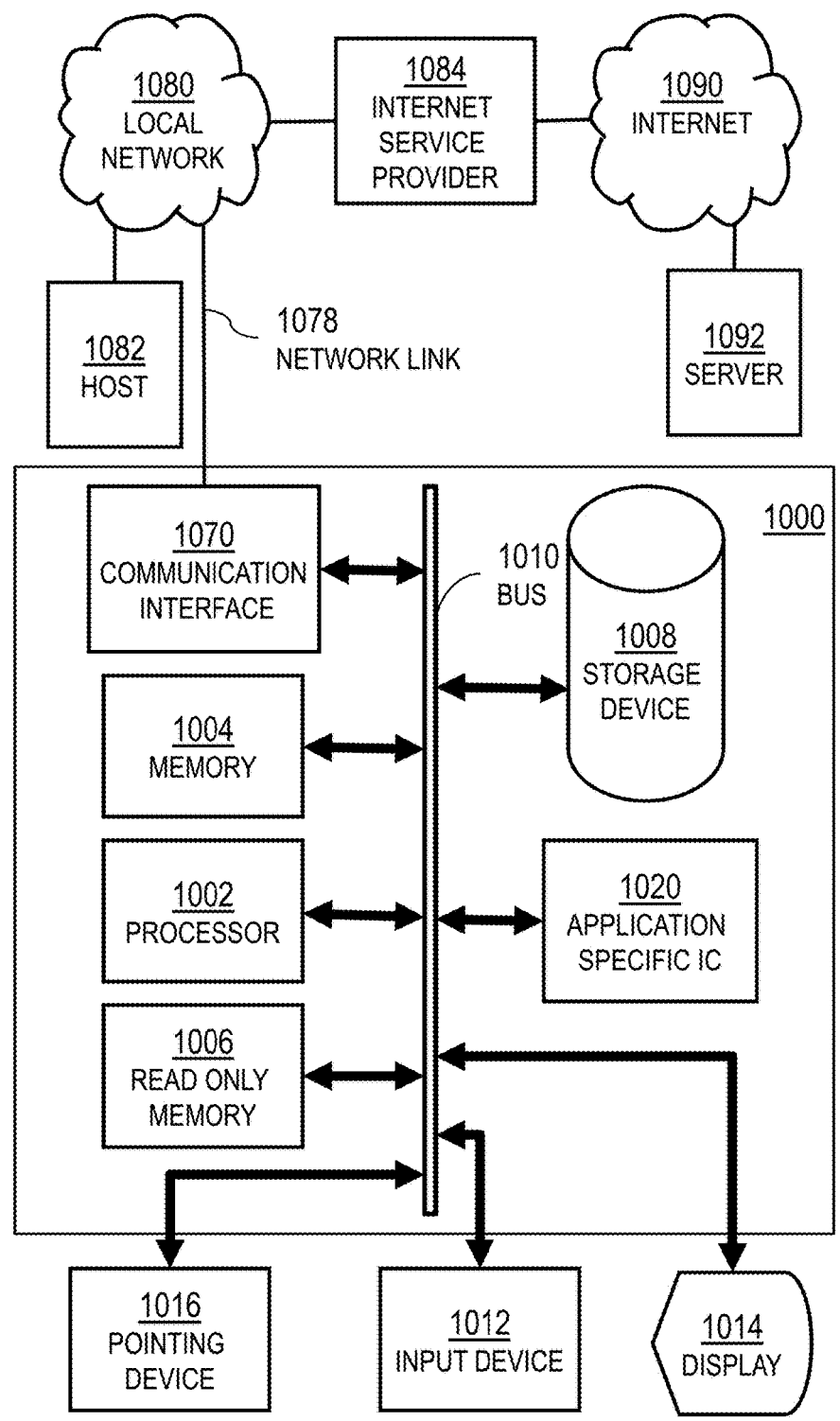
FIG. 10 is a block diagram that illustrates a computer system 1 upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, which carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
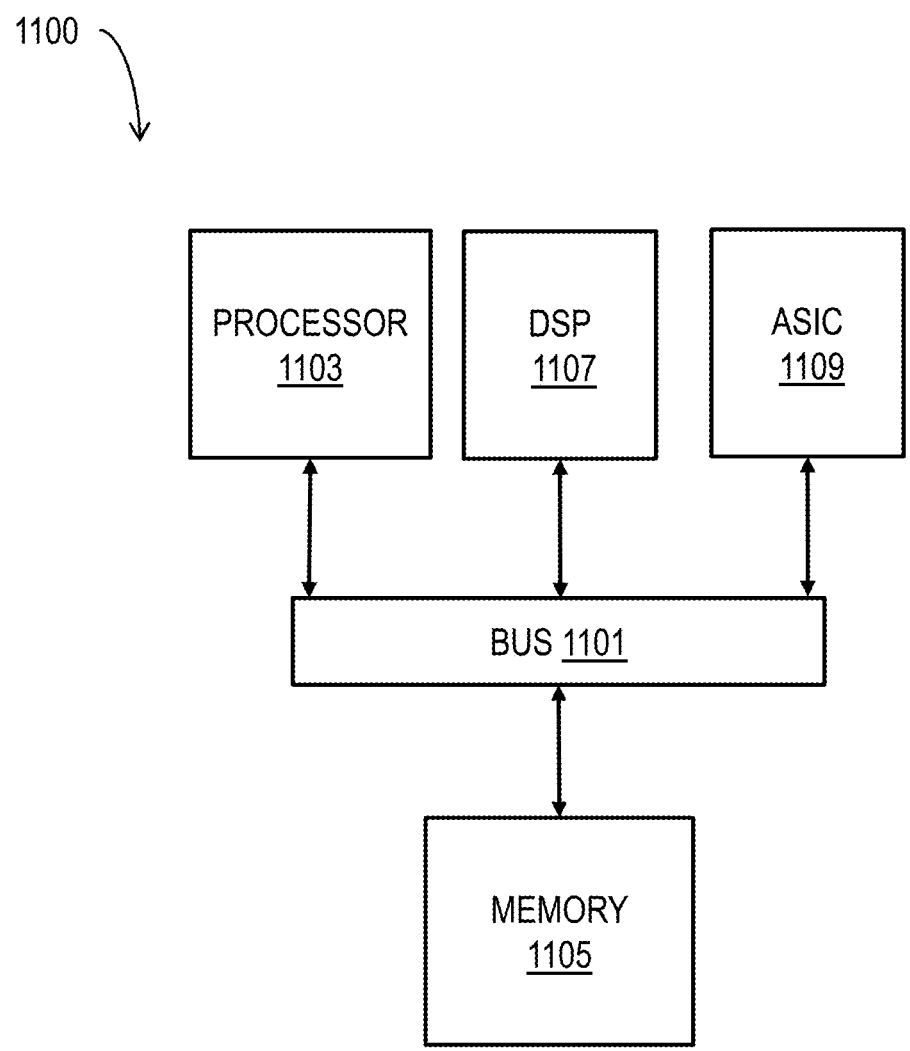
FIG. 11 illustrates a chip set upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

4. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

5. REFERENCES

The following references are hereby incorporated by reference as if fully set forth herein except for terminology that is inconsistent with the terminology used herein.

1. Aull, B. F., Loomis, A. H., Young, D. J., Heinrichs, R. M., Felton, B. J., Daniels, P. J. and Landers, D. J., "Geiger-mode avalanche photodiodes for three-dimensional imaging," Lincoln Lab. J. 13, 335-350 (2002).
2. Beck, S. M., Buck, J. R., Buell, W. F., Dickinson, R. P., Kozlowski, D. A., Marechal, N. J., and Wright, T. J., "Synthetic-aperture imaging laser radar: laboratory demonstration and signal processing," Appl. Opt. 44, 7621-7629 (2005).
3. Berkovic, G. and Shafir E., "Optical methods for distance and displacement measurements," Adv. Opt. Photon. 4, 441-471 (2012).
4. Crouch, S. and Barber, Z. W., "Laboratory demonstrations of interferometric and spotlight synthetic aperture ladar techniques," Opt. Express 20, 24237-24246 (2012).
5. Dapore, B. R., Rabb, D. J., and Haus, J. W., "Phase noise analysis of two wavelength coherent imaging system," Opt. Express 21, 30642-30652 (2013).
6. Duncan, B. D. and Dierking, M. P., "Holographic aperture ladar: erratum," Appl. Opt. 52, 706-708 (2013).
7. Kewitsch, A., Rakuljic, G., Yariv, A., Semiconductor lasers in optical phase-locked loops, WIPO publication WO 2007124063, US Patent Office publication US20060239312
8. Krause, Brian W., Tiemann, Bruce G., and Gatt, Philip, "Motion compensated frequency modulated continuous wave 3D coherent imaging ladar with scannerless architecture," *Appl. Opt.* v51, pp 8745-8761 (2012)
9. Marron, J. C. and Schroeder, K. S., "Three-dimensional lensless imaging using laser frequency diversity," Appl. Opt. 31, 255-262 (1992).
10. Rabb, D. J., Jameson, D. F., Stafford, J. W., and Stokes, A. J., "Multi-transmitter aperture synthesis," Opt. Express 18, 24937-24945 (2010).
11. Roos, P. A., Reibel, R. R., Berg, T., Kaylor, B., Barber, Z. W., and Babbitt, W. R., "Ultrabroadband optical chirp linearization for precision metrology applications," Opt. Lett. 34, 3692-3694 (2009).
12. Satyan, N., Vasilyev, A., Rakuljic, G., Leyva, V., and Yariv, A, "Precise control of broadband frequency chirps using optoelectronic feedback," Opt. Express 17, 15991-15999 (2009)
13. Stafford, J., Duncan, B., and Rabb, D. J., "Range-compressed Holographic Aperture Ladar," in Imaging and Applied Optics 2015, OSA Technical Digest (online) (Optical Society of America, 2015), paper LM1F.3.
14. Tippie, A. E., Kumar, A., and Fienup, J. R., "High-resolution synthetic-aperture digital holography with digital phase and pupil correction," Optics Express 19 (13), 12027-12038 (2011).

What is claimed is:

1. A method comprising:
a) splitting a laser temporally-modulated waveform of bandwidth B and duration D from a laser source into a reference beam and a target beam;
b) directing the target beam onto a target;
c) collecting first data that indicates amplitude and phase of light relative to the reference beam received at each of a plurality of different times during a duration D at each optical detector of an array of one or more optical detectors in a plane perpendicular to the target beam;
d) repeating steps a, b and c for a plurality of sampling conditions;
e) synthesizing the first data for the plurality of sampling conditions to form one or more synthesized sets;
f) forming a digital model of the target for each synthesized set with a down-range resolution based on the bandwidth B; and
g) operating a display device based at least in part on at least a portion of the digital model of the target for at least one synthesized set.

2. A method as recited in claim 1, further comprising determining an average range to the target based on a travel time of a laser pulse reflected from the target and providing a reference path length for the reference beam based on the average range to the target.

3. A method as recited in claim 1, wherein the digital model is a point cloud and the display device is a system configured to render a surface from a point cloud.

4. A method as recited in claim 1, wherein the display device is a system configured to identify an object based on the digital model.

5. A method as recited in claim 1, wherein the display device is a system configured to operate on the target based on the digital model.

6. A method as recited in claim 1, wherein the plurality of sampling conditions are a plurality of different angles from the target to the array of one or more optical detectors.

7. A method as recited in claim 1, wherein the plurality of sampling conditions is a plurality of different times while the target is subjected to a change in environment.

8. The method as recited in claim 1, wherein the one or more synthesized sets includes at least two synthesized sets and the step of operating the display device further comprises operating the display device to present second data that indicates a difference between at least two different digital models formed from the at least two synthesized sets.

9. The method as recited in claim 8, wherein the at least two synthesized sets represent shape of an object for at least two different sampling conditions.

10. A method as recited in claim 9, wherein the plurality of sampling conditions are a plurality of different times while the target is subjected to a change in environment.

11. The method as recited in claim 10 wherein the change in environment is a change in thermal conditions and the difference between the at least two different digital models indicates thermal expansion in response to the change in thermal conditions.

12. The method as recited in claim 11 wherein the thermal expansion is in a range from about 1 micron to about 100 microns.

13. The method as recited in claim 1, wherein synthesizing the first data further comprises, for each synthesized set, selecting a plurality of subsets of the first data, synthesizing each subset separately to produce a synthesized subset and incoherently combining the plurality of synthesized subsets.

14. The method as recited in claim 1, forming the digital model of the target further comprises wherein performing a 3D Fourier transform of each synthesized set such as by performing a one dimensional Fourier Transform of each dimension separately and combining results from all dimensions.

15. The method as recited in claim 1, wherein:
the array of one or more optical detectors is a subset of pixels in a digital camera to allow a frame rate for the subset of pixels to be greater than a frame rate for all the pixels in the digital camera; and
said step d of repeating steps a, b, and c for the plurality of sampling conditions further comprises repeating steps a, b, and c for a plurality of different subsets of the pixels in the digital camera.

16. A system comprising:
- a laser temporally-modulated waveform source configured to produce a target beam and a reference beam each with a bandwidth B and duration D;
- an array of one or more optical detectors in a plane perpendicular to the target beam;
- a display device;
- at least one processor; and
- at least one memory including one or more sequences of instructions,
- the at least one memory and the one or more sequences of instructions configured to, with the at least one processor, cause the at least one processor to perform at least the following,
    - collecting, for a plurality of sampling conditions, first data that indicates amplitude and phase of light relative to the reference beam received at each of a plurality of different times during the duration D at each optical detector of the array of one or more optical detectors;
    - synthesizing the first data for the plurality of sampling conditions to form one or more synthesized sets;
    - forming a digital model of the target for each synthesized set; and
    - operating the display device based at least in part on at least a portion of the digital model of the target for at least one synthesized set.

* * * * *

UNITED STATES PATENT AND TRADEMARK OFFICE
CERTIFICATE OF CORRECTION

| | | |
|---|---|---|
| PATENT NO. | : 10,527,729 B2 | Page 1 of 1 |
| APPLICATION NO. | : 16/026085 | |
| DATED | : January 7, 2020 | |
| INVENTOR(S) | : Stephen C. Crouch et al. | |

It is certified that error appears in the above-identified patent and that said Letters Patent is hereby corrected as shown below:

On the Title Page

Please update the section of the Applicant and Assignee, as follows:
(71) Applicant: AURORA OPERATIONS, INC., PITTSBURGH, PA (US)
(73) Assignee: AURORA OPERATIONS, INC., PITTSBURGH, PA (US)

Signed and Sealed this
Thirteenth Day of February, 2024

Katherine Kelly Vidal
*Director of the United States Patent and Trademark Office*